(12) United States Patent
Weder

(10) Patent No.: US 6,425,224 B1
(45) Date of Patent: *Jul. 30, 2002

(54) SLEEVES FORMED OF POLYMERIC MATERIALS HAVING A TEXTURE OR APPEARANCE SIMULATING THE TEXTURE OR APPEARANCE OF PAPER

(75) Inventor: Donald E. Weder, Highland, IL (US)

(73) Assignee: Southpac Trust International, Inc., Raratonga Cook Island ( * ) Notice: Subject to any disclaimer, the term of this patent is extended or adjusted under 35 U.S.C. 154(b) by 0 days.

This patent is subject to a terminal disclaimer.

(21) Appl. No.: 09/746,388

(22) Filed: Dec. 21, 2000

Related U.S. Application Data

(62) Division of application No. 09/153,428, filed on Sep. 14, 1998.

(51) Int. Cl.[7] ............................................... B65B 25/02
(52) U.S. Cl. ............................. 53/397; 53/399; 53/411
(58) Field of Search .......................... 53/411, 461, 464, 53/465, 399, 397, 390, 210, 219

(56) References Cited

U.S. PATENT DOCUMENTS

| | | | |
|---|---|---|---|
| 524,219 A | 8/1894 | Schmidt | |
| 583,925 A | 6/1897 | McGowan | ................. 206/423 |
| 732,889 A | 7/1903 | Paver | |
| 950,785 A | 3/1910 | Pene | |
| 1,063,154 A | 5/1913 | Bergen | |
| 1,446,563 A | 2/1923 | Hughes | |
| 1,520,647 A | 12/1924 | Hennigan | |
| 1,525,015 A | 2/1925 | Weeks | |
| 1,610,652 A | 12/1926 | Bouchard | |
| 1,697,751 A | 1/1929 | Blake | ........................... 229/87 |
| 1,794,212 A | 2/1931 | Snyder | ............................ 47/84 |
| 1,863,216 A | 6/1932 | Wordingham | |

(List continued on next page.)

FOREIGN PATENT DOCUMENTS

| | | | |
|---|---|---|---|
| AU | 4231978 | 6/1979 | |
| BE | 654427 | 1/1965 | |
| CH | 560532 | 4/1975 | |
| DE | 345464 | 12/1921 | |
| DE | 513971 | 11/1930 | |
| DE | 1166692 | 3/1964 | |
| DE | 1962947 | 6/1971 | |
| DE | 2060812 | 11/1971 | |
| DE | 2147277 | 5/1973 | ................ 53/136.2 |
| DE | 2748626 | 5/1979 | |
| DE | 2948265 | 5/1981 | ................. 206/423 |
| DE | 3445799 | 6/1986 | |
| DE | 3829281 | 5/1989 | |

(List continued on next page.)

OTHER PUBLICATIONS

Speed Cover®, The Simple Solution For These Peak Volume Periods, Highland Supply Corporation, 1989.
"Speed Sheets and Speed Rolls" Brochure, Highland Supply Corporation, ©, 1990.
"Color Them Happy with Highlander Products" ©1992.
"Costa Keeps the Christmas Spirit", Supermarket Floral, Sep. 15, 1992.
"Super Seller", Supermarket Floral, Sep. 15, 1992.
"Halloween", Link Magazine, Sep. 1992.
"Now More Than Ever", Supermarket Floral, Sep. 15, 1992.

(List continued on next page.)

Primary Examiner—John Sipos
(74) Attorney, Agent, or Firm—Dunlap, Codding & Rogers, P.C.

(57) ABSTRACT

A substantially flexible, shape-sustaining article having an appearance simulating paper made by forming a flexible, laminated material having a paper-like texture or appearance into a substantially flexible article for receiving an object. The substantially flexible article includes a base having a lower end, an open upper end with an object opening extending therethrough and a decorative border extending outwardly from the open upper end of the base. The lower end of the base of the article may be closed and may also contain a gusset.

72 Claims, 9 Drawing Sheets

U.S. PATENT DOCUMENTS

| | | | |
|---|---|---|---|
| 1,892,818 A | 1/1933 | Trew | |
| 1,978,631 A | 10/1934 | Herrlinger | 91/68 |
| 2,048,123 A | 7/1936 | Howard | 229/87 |
| RE21,065 E | 5/1939 | Copeman | 93/2 |
| 2,170,147 A | 8/1939 | Lane | 206/56 |
| 2,200,111 A | 5/1940 | Bensel | 229/1.5 |
| 2,268,244 A | 12/1941 | Davis | 53/419 |
| 2,278,673 A | 4/1942 | Savada et al. | 154/43 |
| 2,302,259 A | 11/1942 | Rothfuss | 41/10 |
| 2,323,287 A | 7/1943 | Amberg | 229/53 |
| 2,355,559 A | 8/1944 | Renner | 229/8 |
| 2,371,985 A | 3/1945 | Freiberg | 206/46 |
| 2,411,328 A | 11/1946 | MacNab | 33/12 |
| 2,510,120 A | 6/1950 | Leander | 117/122 |
| 2,529,060 A | 11/1950 | Trillich | 117/68.5 |
| 2,621,142 A | 12/1952 | Wetherell | 154/117 |
| 2,648,487 A | 8/1953 | Linda | 229/55 |
| 2,679,887 A | 6/1954 | Doyle et al. | |
| 2,688,354 A | 9/1954 | Berger | 150/28 |
| 2,774,187 A | 12/1956 | Smithers | 47/41 |
| 2,785,508 A | 3/1957 | Coleman, Jr. | 47/72 |
| 2,822,287 A | 2/1958 | Avery | 117/14 |
| 2,846,060 A | 8/1958 | Yount | 206/58 |
| 2,850,842 A | 9/1958 | Eubank, Jr. | 47/58 |
| 2,883,262 A | 4/1959 | Borin | 21/56 |
| 2,989,828 A | 6/1961 | Warp | 53/390 |
| 3,022,605 A | 2/1962 | Reynolds | 47/58 |
| 3,058,263 A | 10/1962 | Reynolds | D11/162 |
| 3,080,680 A | 3/1963 | Reynolds | 47/37 |
| 3,094,810 A | 6/1963 | Kalpin | 47/37 |
| 3,121,647 A | 2/1964 | Harris et al. | 118/202 |
| 3,130,113 A | 4/1964 | Silman | 161/97 |
| 3,271,922 A | 9/1966 | Wallerstein et al. | 53/3 |
| 3,322,325 A | 5/1967 | Bush | 229/62 |
| 3,376,666 A | 4/1968 | Leonard | 47/41 |
| 3,380,646 A | 4/1968 | Doyen et al. | 229/57 |
| 3,431,706 A | 3/1969 | Stuck | 53/390 |
| 3,508,372 A | 4/1970 | Wallerstein et al. | 53/3 |
| 3,510,054 A | 5/1970 | Sanni et al. | 229/66 |
| 3,512,700 A | 5/1970 | Evans et al. | 229/53 |
| 3,552,059 A | 1/1971 | Moore | 47/41.12 |
| 3,554,434 A | 1/1971 | Anderson | 229/55 |
| 3,556,389 A | 1/1971 | Gregoire | 229/53 |
| 3,557,516 A | 1/1971 | Brandt | 53/14 |
| 3,620,366 A | 11/1971 | Parkinson | 206/59 |
| 3,681,105 A | 8/1972 | Milutin | 117/15 |
| 3,767,104 A | 10/1973 | Bachman et al. | 229/7 |
| 3,793,799 A | 2/1974 | Howe | 53/32 |
| 3,869,828 A | 3/1975 | Matsumoto | 47/34.11 |
| 3,888,443 A | 6/1975 | Flanigen | 248/152 |
| 3,962,503 A | 6/1976 | Crawford | 428/40 |
| 4,043,077 A | 8/1977 | Stonehocker | 47/66 |
| 4,054,697 A | 10/1977 | Reed et al. | 428/40 |
| 4,091,925 A | 5/1978 | Griffo et al. | 206/423 |
| 4,104,845 A | 8/1978 | Hoffman | 53/410 |
| 4,113,100 A | 9/1978 | Soja et al. | 206/602 |
| 4,118,890 A | 10/1978 | Shore | 47/28 |
| 4,189,868 A | 2/1980 | Tymchuck et al. | 47/84 |
| 4,199,627 A | 4/1980 | Weder et al. | 428/7 |
| 4,201,818 A | 5/1980 | Rohn | 428/159 |
| 4,216,620 A | 8/1980 | Weder et al. | 47/72 |
| 4,248,347 A | 2/1981 | Trimbee | 206/423 |
| D259,333 S | 5/1981 | Charbonneau | D9/306 |
| 4,265,049 A | 5/1981 | Gorewitz | 47/26 |
| 4,280,314 A | 7/1981 | Stuck | 53/241 |
| 4,292,266 A | 9/1981 | Weder et al. | 264/140 |
| 4,297,811 A | 11/1981 | Weder | 47/72 |
| 4,333,267 A | 6/1982 | Witte | 47/84 |
| 4,347,686 A | 9/1982 | Wood | 47/73 |
| 4,380,564 A | 4/1983 | Cancio et al. | 428/167 |
| 4,400,910 A | 8/1983 | Koudstall et al. | 47/84 |
| 4,413,725 A | 11/1983 | Bruno et al. | 206/45.33 |
| D279,279 S | 6/1985 | Wagner | D11/143 |
| 4,546,875 A | 10/1985 | Zweber | 206/0.82 |
| 4,621,733 A | 11/1986 | Harris | 206/423 |
| 4,640,079 A | 2/1987 | Stuck | 53/390 |
| 4,717,262 A | 1/1988 | Roen et al. | 383/120 |
| 4,733,521 A | 3/1988 | Weder et al. | 53/580 |
| 4,765,464 A | 8/1988 | Ristvedt | 206/0.82 |
| 4,771,573 A | 9/1988 | Stengel | 47/67 |
| 4,773,182 A | 9/1988 | Weder et al. | 47/72 |
| 4,801,014 A | 1/1989 | Meadows | 206/423 |
| 4,810,109 A | 3/1989 | Castel | 383/105 |
| 4,835,834 A | 6/1989 | Weder | 29/525 |
| D301,991 S | 7/1989 | Van Sant | D11/149 |
| 4,941,572 A | 7/1990 | Harris | 206/423 |
| 4,980,209 A | 12/1990 | Hill | 428/34.1 |
| 5,038,930 A | 8/1991 | Holtkamp, Jr. | 206/423 |
| 5,065,922 A | 11/1991 | Harris | 206/423 |
| 5,073,161 A | 12/1991 | Weder et al. | 493/154 |
| 5,074,675 A | 12/1991 | Osgood | 383/122 |
| 5,088,972 A | 2/1992 | Parker | 493/352 |
| 5,094,060 A | 3/1992 | Caird | 53/390 |
| 5,105,599 A | 4/1992 | Weder | 53/399 |
| 5,111,638 A | 5/1992 | Weder | 53/397 |
| 5,120,382 A | 6/1992 | Weder | 156/212 |
| 5,134,013 A | 7/1992 | Parker | 428/182 |
| 5,152,100 A | 10/1992 | Weder et al. | 47/72 |
| 5,173,352 A | 12/1992 | Parker | 428/174 |
| 5,181,364 A | 1/1993 | Weder | 53/397 |
| D335,105 S | 4/1993 | Ottenwalder et al. | D11/164 |
| 5,199,242 A | 4/1993 | Weder et al. | 53/397 |
| 5,200,253 A | 4/1993 | Yamaguchi et al. | 428/195 |
| 5,205,108 A | 4/1993 | Weder et al. | 53/397 |
| 5,228,234 A | 7/1993 | de Klerk et al. | 47/41.01 |
| 5,235,782 A | 8/1993 | Landau | 47/72 |
| 5,239,775 A | 8/1993 | Landau | 47/72 |
| 5,249,407 A | 10/1993 | Stuck | 53/399 |
| 5,259,106 A | 11/1993 | Weder et al. | 29/469.5 |
| 5,307,606 A | 5/1994 | Weder | 53/410 |
| 5,315,785 A | 5/1994 | Avôt et al. | 47/72 |
| 5,345,745 A | 9/1994 | Weder | 53/397 |
| 5,350,240 A | 9/1994 | Billman et al. | 383/104 |
| 5,353,575 A | 10/1994 | Stepanek | 53/461 |
| 5,361,482 A | 11/1994 | Weder et al. | 29/469 |
| 5,388,386 A | 2/1995 | Weder | 53/397 |
| 5,388,695 A | 2/1995 | Gilbert | 206/423 |
| 5,403,259 A | 4/1995 | Parker | 493/352 |
| 5,428,939 A | 7/1995 | Weder et al. | 53/397 |
| 5,443,670 A | 8/1995 | Landau | 156/191 |
| 5,448,875 A | 9/1995 | Weder | 53/397 |
| 5,493,809 A | 2/1996 | Weder et al. | 47/72 |
| D368,025 S | 3/1996 | Sekerak et al. | D9/305 |
| 5,496,251 A | 3/1996 | Cheng | 493/224 |
| 5,496,252 A | 3/1996 | Gilbert | 493/224 |
| D368,654 S | 4/1996 | Santoiemmo et al. | D9/415 |
| 5,526,932 A | 6/1996 | Weder | 206/423 |
| 5,572,849 A | 11/1996 | Weder et al. | 53/399 |
| 5,572,851 A | 11/1996 | Weder | 53/399 |
| 5,573,491 A | 11/1996 | Parker | 193/352 |
| 5,575,133 A | 11/1996 | Weder et al. | 53/397 |
| 5,617,703 A | 4/1997 | Weder | 53/413 |
| 5,624,320 A | 4/1997 | Martinez | 472/51 |
| 5,647,168 A | 7/1997 | Gilbert | 47/72 |
| 5,656,008 A | 8/1997 | Beierlorzer | 493/346 |
| 5,712,020 A | 1/1998 | Parker | 428/182 |
| 5,752,360 A | 5/1998 | Weder | 53/397 |
| 5,811,493 A | 9/1998 | Kent | 525/92 |
| 5,871,432 A | 2/1999 | Beierlorzer | 493/352 |
| 5,897,926 A | 4/1999 | Milulas | 428/17 |

| | | | | | |
|---|---|---|---|---|---|
| 5,906,569 A | 5/1999 | Miyamoto et al. ......... 29/564.1 | WO | 9315979 | 8/1993 |
| 5,921,907 A | 7/1999 | Beierlorzer ................. 493/357 | WO | 9916615 | 4/1999 |

FOREIGN PATENT DOCUMENTS

| | | |
|---|---|---|
| DE | 3911847 | 10/1990 |
| EP | 0050990 | 5/1982 |
| EP | 0791543 | 8/1997 |
| FR | 1376047 | 9/1964 |
| FR | 2036163 | 12/1970 |
| FR | 2137325 | 12/1972 |
| FR | 2272914 | 12/1975 |
| FR | 2489126 | 3/1982 |
| FR | 2610604 | 8/1988 |
| FR | 2603159 | 3/1989 |
| FR | 2619698 | 3/1989 |
| GB | 5605 | 5/1885 |
| GB | 1204647 | 9/1970 |
| GB | 2056410 | 3/1981 |
| GB | 2074542 | 11/1981 |
| GB | 2128083 | 4/1984 |
| GB | 2252708 | 8/1992 |
| IT | 224507 | 4/1996 |
| JP | 542958 | 2/1993 |
| NL | 8301709 | 12/1984 |
| NL | 1000658 | 1/1996 |

OTHER PUBLICATIONS

Le Plant Sac Advertisement, published prior to Sep. 26, 1987.

"A World of Cut Flower and Pot Plant Packaging" Brochure, Klerk's Plastic Products Manufacturing, Inc., published prior to Mar. 31, 1994, 6 pages.

Chantler & Chantler brochure showing Zipper Sleeve™ and Florasheet®, published prior to Mar. 31, 1994, 2 pages.

"Foil Jackets" brochure, Custom Medallion, Inc., Dec. 1996, 2 pages.

"Derwent Abstract" of FR 2610604A. It is noted that the abstract is an incorrect English translation of the contents of the French patent. The French patent does not enable or disclose adhesively attaching the covering to the container 1988.

"Silver Linings" Brochure, Affinity Diversified Industries, Inc., 1986. The Silver Linings brochure shows a floral sleeve with a closed bottom. The brochure shows, in one embodiment, a vase with flowers inside a "cut flower" sleeve with the sleeve tied with a ribbon about the neck of the vase.

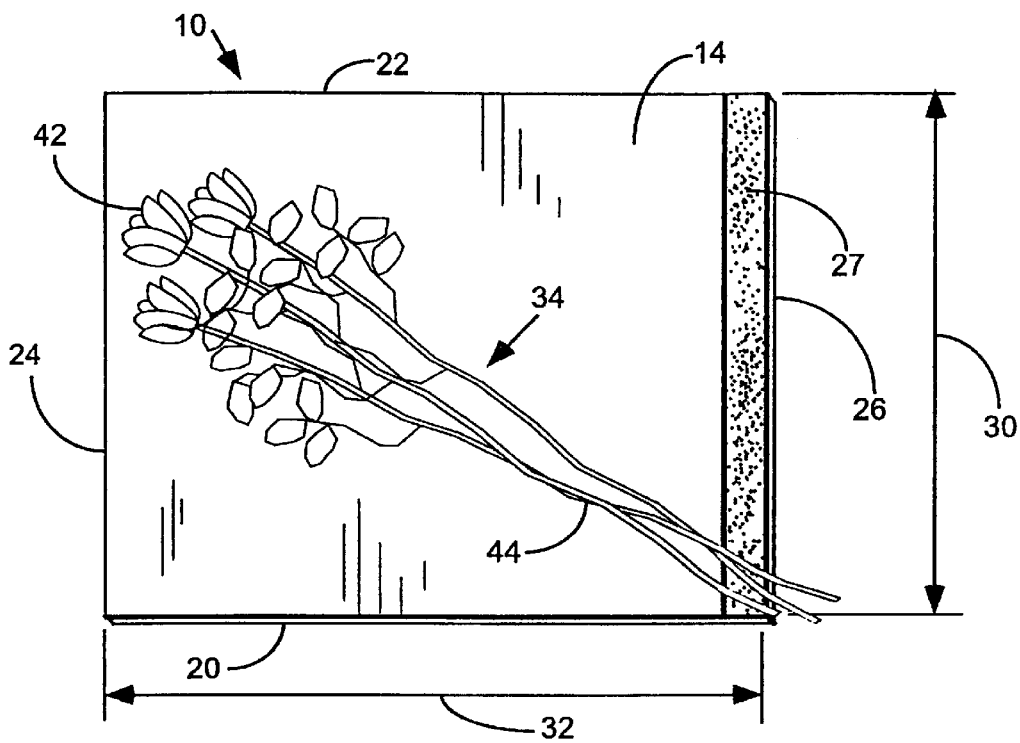
FIG. 3
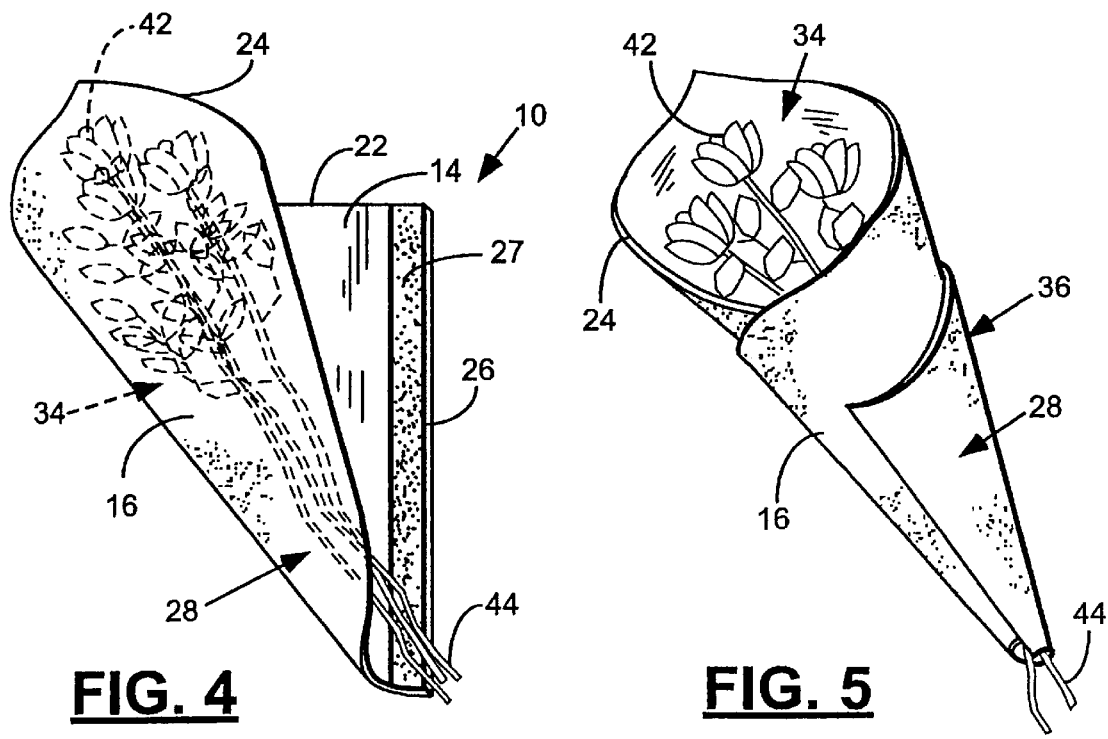
FIG. 4  FIG. 5

SLEEVES FORMED OF POLYMERIC MATERIALS HAVING A TEXTURE OR APPEARANCE SIMULATING THE TEXTURE OR APPEARANCE OF PAPER

CROSS REFERENCE TO RELATED APPLICATIONS

This application is a divisional of U.S. Ser. No. 09/153,428, filed Sep. 14, 1998, entitled "SLEEVES FORMED OF POLYMERIC MATERIALS HAVING A TEXTURE AND APPEARANCE OF PAPER".

STATEMENT REGARDING FEDERALLY SPONSORED RESEARCH OR DEVELOPMENT

Not applicable.

FIELD OF THE INVENTION

The present invention relates to polymeric materials having a texture and appearance assimilating paper, and more particularly but not by way of limitation, to preformed, shape-sustaining flower pot covers, flower pot and floral wrappings, ribbon materials and decorative grasses made from such polymeric materials. In one aspect, the present invention relates to methods for producing preformed, shape-sustaining flower pot covers and methods of wrapping floral groupings and flower pots with a sheet of polymeric material having a texture and appearance assimilating paper to provide a decorative cover for such floral groupings and flower pots. In yet another aspect, the present invention relates to methods of producing decorative grasses having a texture and appearance assimilating paper.

BRIEF DESCRIPTION OF THE DRAWINGS

FIG. 3 is a perspective view of the sheet of polymeric material having a texture and appearance assimilating paper of FIG. 2 having a floral grouping disposed thereon.

FIG. 4 is a perspective view of the floral grouping of FIG. 3 being wrapped with the sheet of polymeric material having a texture and appearance assimilating paper of FIG. 2 by one method of wrapping.

FIG. 5 is a perspective view of a decorative cover for the floral grouping formed from the sheet of polymeric material having a texture and appearance assimilating paper of FIG. 2 wherein the decorative cover formed from the sheet of material has a conical configuration.

DETAILED DESCRIPTION

Description of FIGS. 1–9

Figure 1:
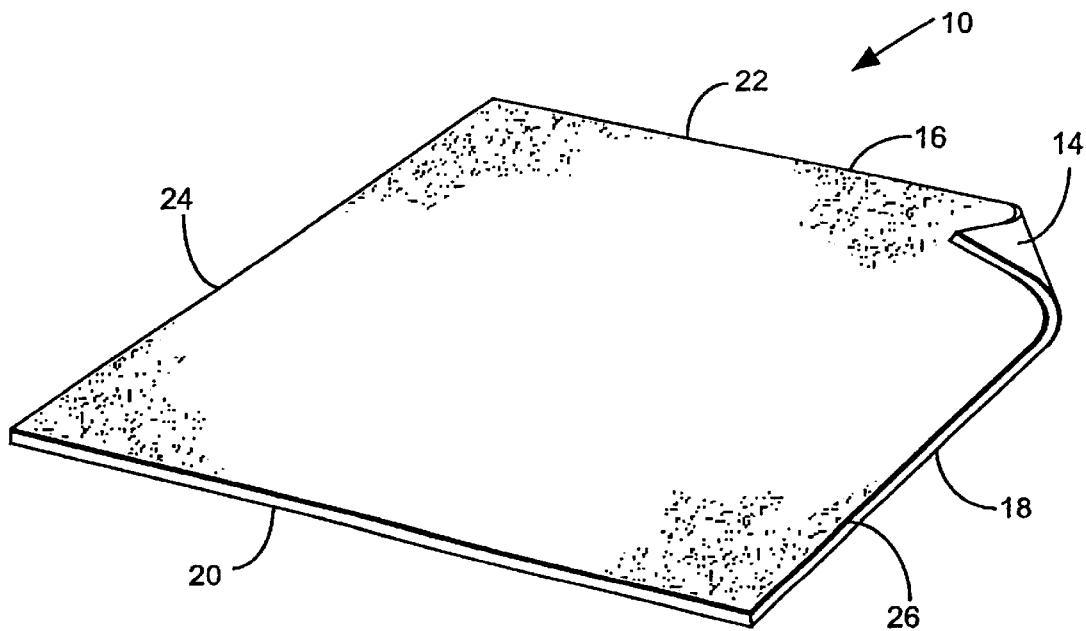
FIG. 1 is a perspective view of a sheet of polymeric material having a texture and appearance assimilating paper constructed in accordance with the present invention.
Figure 2:
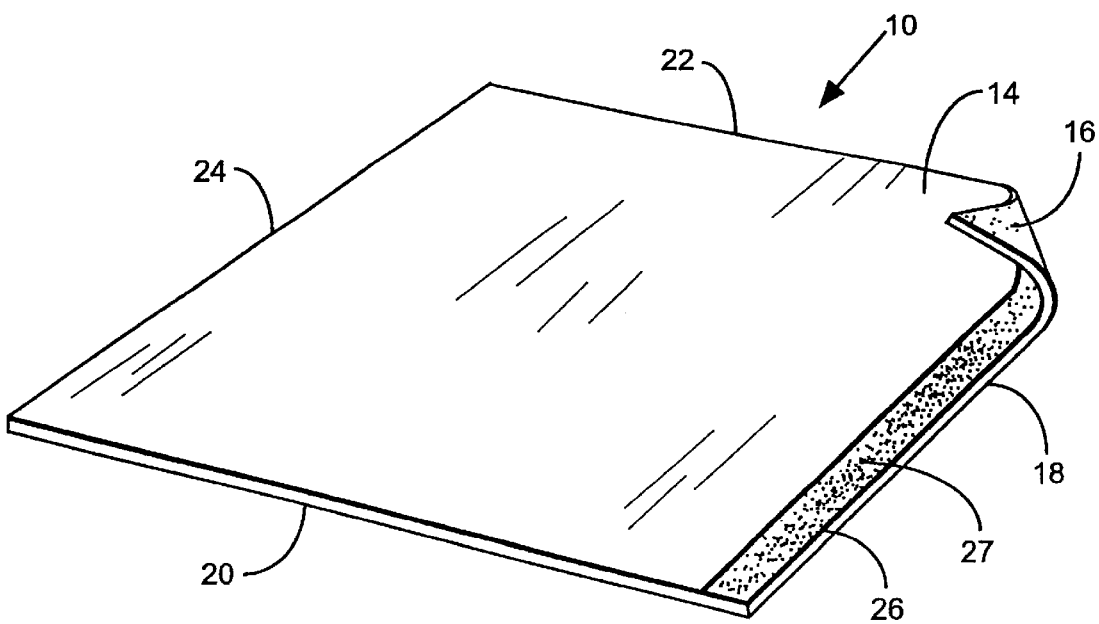
FIG. 2 is a perspective view of the sheet of polymeric material having a texture and appearance assimilating paper of FIG. 1 having a bonding material disposed along one edge thereof.

Referring now to FIGS. 1 and 2, designated generally by the reference numeral 10 is a sheet or web of polymeric material having a texture and appearance assimilating paper (hereinafter referred to as the sheet of polymeric material 10 or the sheet of polymeric material 10 having a texture and appearance assimilating paper). That is, at least one surface of the sheet of polymeric material 10 has been modified to provide a matt or textured finish assimilating the texture and appearance of paper.

The modification of the sheet of polymeric material 10 to provide the sheet of polymeric material with a matt or textured finish assimilating paper in texture and appearance can be accomplished in several ways. For example, a matt finish can be provided by printing a desired pattern on the sheet of polymeric material and thereafter laminating a matt material, such as a translucent polymeric film over the printed pattern. To further enhance the texture and appearance assimilating paper of the sheet of polymeric material 10, the matt material may or may not have a plurality of spatially disposed holes extending therethrough. A matt or textured finish can also be produced by printing a sheet of polymeric material with a matted (i.e. dull finish) ink, by lacquering at least one surface of the sheet of polymeric material with a dull finish lacquer or a matting lacquer, by embossing the sheet of polymeric material to provide an embossed pattern simulating the weave or texture of cloth, or by embossing and printing the sheet of polymeric material to provide embossed and printed patterns wherein the embossed and printed patterns may be in registry, out of registry or wherein a portion of the embossed and printed patterns are in registry and a portion of the embossed and printed patterns are out of registry. A matt or textured finish capable of providing the sheet of polymeric material with a texture and appearance assimilating paper can also be achieved by extruding a polymeric resin onto a matted or textured chill roll or by laminating a second sheet of material to the sheet of polymeric material. A matt or textured finish capable of providing the sheet of polymeric material with a texture and appearance assimilating paper can also be achieved through the use of selected pigments, such as $TiO_2$.

The sheet of polymeric material 10 having a texture and appearance assimilating paper has an upper surface 14, a lower surface 16, and an outer peripheral edge 18. At least one surface of the sheet of polymeric material 10, such as the lower surface 16, is matted or textured as described above to provide the sheet of polymeric material with a texture and appearance assimilating paper. The outer peripheral edge 18 of the sheet of polymeric material 10 comprises a first side 20, a second side 22, a third side 24, and a fourth side 26. A bonding material 27 (FIG. 2) may be disposed on at least a portion of one or both surfaces of the sheet of material 10, such as the upper surface 14 thereof as shown. and as further illustrated in U.S. Pat. No. 5,181,364, the specification of which is hereby expressly incorporated herein by reference.

The sheet of polymeric material 10 having a texture and appearance assimilating paper may be employed to provide a decorative cover for a floral grouping (FIGS. 3 and 6) or a decorative cover for a flower pot (FIG. 7); to form a preformed flower pot cover for covering a flower pot (FIGS. 10 and 11); to provide a sleeve for wrapping or covering a floral grouping (FIGS. 14 and 16) or a flower pot (FIGS. 18 and 19); to provide a ribbon material having a (FIG. 20A); or to produce decorative grass (FIGS. 21 and 22A). The use of the sheet of polymeric material 10 to form a decorative cover for a floral grouping or a flower pot wherein the decorative cover is provided with a texture and appearance assimilating the texture and appearance of paper, or to form a sleeve for a floral grouping or a flower pot wherein the sleeve is provided with a texture and appearance assimilating the texture and appearance of paper, or to form a preformed flower pot cover having a texture and appearance assimilating the texture and appearance of paper, or as a ribbon material having a texture and appearance assimilating the texture and appearance of paper or to produce decorative grasses having a texture and appearance assimilating the texture and appearance of paper will be described in more complete detail herein.

As noted above, the sheet of polymeric material 10 having a texture and appearance assimilating the texture and appearance of paper can be utilized to form a decorative cover for a floral grouping or a flower pot. The term "flower pot" as used herein refers to any type of container for holding a floral grouping, or a plant, or even another pot-type container. Examples of flower pots and/or pot-type containers include, but are not limited to, clay pots, wooden pots, plastic pots, pots made from natural and/or synthetic fibers, or any combination thereof. Such flower pots and or pot-type containers are provided with a retaining space for receiving a floral grouping. The floral grouping may be disposed within the retaining space of the flower pot with a suitable growing medium described in further detail below, or other retaining medium, such as a floral foam. It will also be understood that in some cases the floral grouping, and any appropriate growing medium or other retaining medium, may be disposed in a sleeve formed from the sheet of material 10 if the sleeve is adapted to contain a medium.

"Floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. Further, the floral grouping may comprise a growing potted plant having a root portion as well. However, it will be appreciated that the floral grouping may consist of only a single bloom or only foliage, or a botanical item (not shown), or a propagule. The term "floral grouping" may be used interchangeably herein with the term "floral arrangement". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singularly or in combination. The term "botanical item" also means any portion or portions of natural or artificial herbaceous or woody plants including stems, leaves, flowers, blossoms, buds, blooms, cones, or roots, taken singularly or in combination, or in groupings of such portions such as bouquets or floral groupings.

The term "propagule" when used herein means any structure capable of being propagated or acting as an agent of reproduction including seeds, shoots, stems, runners, tubers, plants, leaves, roots or spores.

In the embodiments shown in the drawings, the sheet of polymeric material 10 having a texture and appearance assimilating paper in texture and appearance is square. It will be appreciated, however, that the sheet of polymeric material 10 having a texture and appearance assimilating paper in texture and appearance can be of any shape, configuration or size as long as the sheet of polymeric material 10 is sufficiently sized and shaped to wrap and encompass a floral grouping or a flower pot. For example, the sheet of polymeric material 10 may have a rectangular, round, oval, octagonal or asymmetrical shape. Further, multiple sheets of the polymeric material 10 may be used in a single circumstance to provide a decorative cover or sleeve for a floral grouping or a flower pot. Moreover, when multiple sheets of the polymeric material 10 having a texture and appearance assimilating paper in texture and appearance are used in combination, the sheets of polymeric material 10 need not be uniform in size or shape. Finally, it will be appreciated that the sheet of polymeric material 10 having a texture and appearance assimilating the texture and appearance of paper shown herein is a substantially flat sheet except for the texturing, matting, embossing, flocking, application of a foamable lacquer or foamable ink, or other treatments and techniques employed to provide the sheet of polymeric material 10 with the desired texture or matting so that the sheet of polymeric material 10 has a texture and appearance assimilating the texture and appearance of paper.

Any thickness or stiffness of the sheet of polymeric material 10 may be utilized in accordance with the present invention as long as the sheet of material 10 can be modified to provide the sheet of polymeric material with a texture and appearance assimilating the texture and appearance of paper and the sheet of material 10 having a texture and appearance assimilating paper can be wrapped about at least a portion of a floral grouping or a flower pot to form a decorative cover for the floral group or the flower pot, or formed into a preformed flower pot cover for covering a flower pot, or a sleeve for wrapping or covering a floral grouping or a flower pot, or to provide a ribbon or decorative grass. Generally, the sheet of polymeric material 10 will have a thickness of from about 0.1 mil to about 30 mils, and more desirably a thickness of from about 0.5 mils to about 10 mils. The terms "polymer film", "polymeric film" and "polymeric material" when used herein means a synthetic polymer such as a polypropylene, a naturally occurring polymer such as cellophane, an extruded polymeric material having an expanded core such as extruded polypropylene having an expanded core and combinations thereof. The extruded polymeric material having an expanded core may also be referred to herein as an expanded core polymeric material.

"Extruded polymeric material having an expanded core" or "expanded core polymeric film" as used herein means any extrudable polymeric material or polymeric film in which the core is expanded during extrusion, such as by incorporation of a blowing agent in the polymeric resin which is being extruded.

The sheet of material 10 having a texture and appearance of paper may also be constructed, in whole or in part, from a cling material. "Cling material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of a flower pot. This connecting engagement is preferably temporary in that the material may be easily removed, i.e., the cling material "clings" to the flower pot.

The cling material is constructed and treated if necessary, from polyethylene such as Cling Wrap made by Glad®, First Brands Corporation, Danbury, Conn. The thickness of the cling material will, in part, depend upon the size of sleeve and the size of the flower pot in the sleeve, i.e., generally, a larger flower pot may require a thicker and therefore stronger cling material. The cling material will range in thickness from about 0.1 mils to about 10 mils, and more desirably from about 0.5 mils to about 2.5 mils. However, any thickness of cling material may be utilized in accordance with the present invention which permits the cling material to be modified as hereinbefore described to provide the cling material with a texture and appearance assimilating the texture and appearance of paper.

Figure 9A:
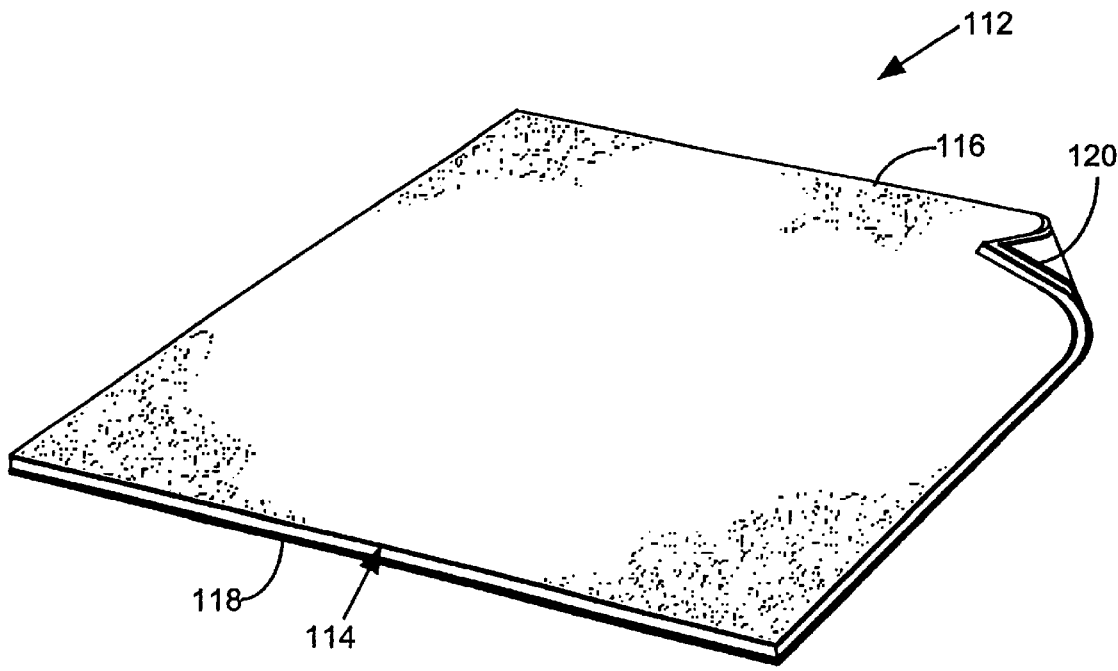
FIG. 9A is a perspective view of a sheet of expanded core polymeric film having a texture and appearance assimilating paper wherein an acrylic heat sealable lacquer is disposed on at least one surface thereof.
Figure 9B:
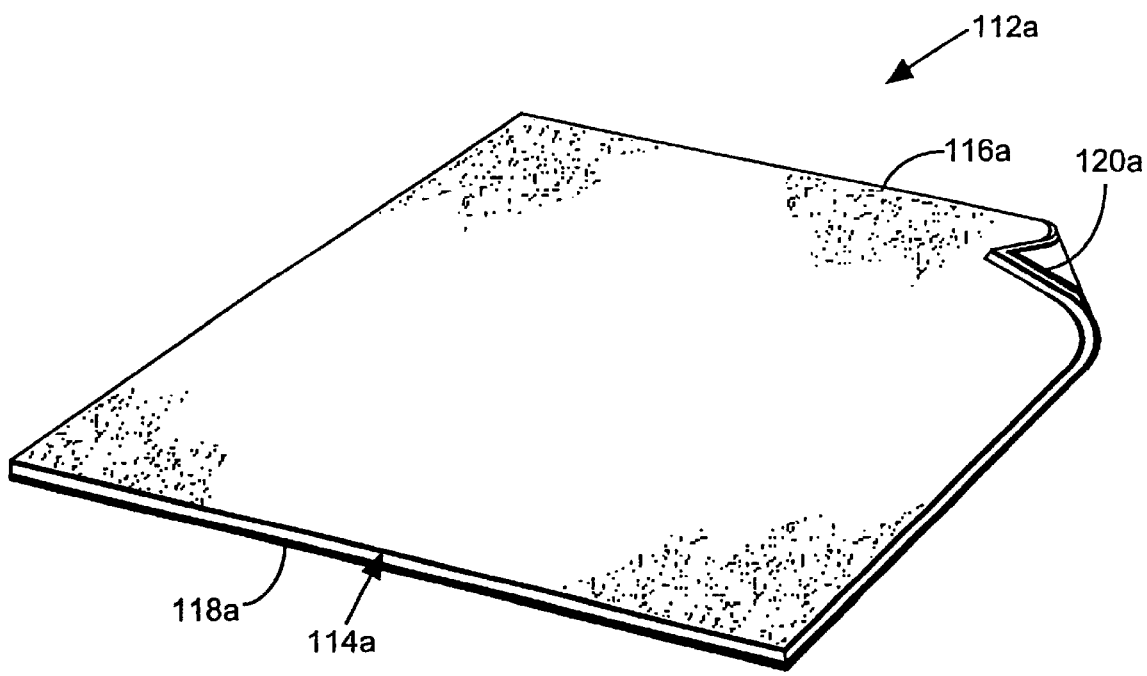
FIG. 9B is a perspective view of a laminated sheet of material wherein one surface is modified or textured to provide the sheet of laminated material with a texture and appearance assimilating paper.

A decorative cover for a floral grouping (FIGS. 3 and 6), or a decorative cover for a flower pot (FIG. 7), or a preformed flower pot cover for covering a flower pot (FIGS. 10 and 11), or a sleeve for wrapping or covering a floral grouping (FIGS. 14 and 16) or a flower pot (FIGS. 18 and 19), or a ribbon material (FIG. 20A), or decorative grass (FIGS. 21 and 22A) may also be constructed of a laminated material having a texture and appearance assimilating paper in texture and appearance (FIG. 9B). The laminated material having a texture and appearance assimilating the texture and appearance of paper can be produced by laminating two or more sheets of polymeric film (such as two or more sheets of polypropylene film or a sheet of polypropylene film and a sheet of expanded core polymeric film, such as expanded core polypropylene film), or by laminating a polymeric film (such as polypropylene film or an expanded core polymeric film) to metallized foil and the like wherein at least one surface of the laminated material is textured or modified to assimilate the texture and appearance of paper. The only requirements in using a laminated material having a texture and appearance assimilating paper in texture and appearance to form a decorative cover for a floral grouping, or a decorative cover for a flower pot, or a preformed flower pot cover for covering a flower pot, or a sleeve for wrapping or covering a floral grouping or a flower pot, or as ribbon material or decorative grass in accordance with the present invention is that at least one surface of the laminated material be capable of being modified to provide the laminated material with at least one surface having a texture and appearance assimilating the texture and appearance of paper and that the laminated material be sufficient flexible or pliable to permit the laminated material to be formed into a decorative cover for a floral grouping, or a decorative cover for a flower pot, or a preformed flower pot cover for covering a flower pot, or a sleeve for wrapping or covering a floral grouping or a flower pot, or to be used as ribbon material or decorative grass. It should also be noted that two or more separate sheets of polymeric material can be used to form a decorative cover for a floral grouping, or a decorative cover for a flower pot, or a preformed flower pot cover for covering a flower pot, or a sleeve for wrapping or covering a floral grouping or a flower pot as long as one of the sheets of polymeric material is modified or textured to provide same with a texture and appearance assimilating paper.

The sheet of polymeric material 10 or a laminated material (FIG. 9B) having a texture and appearance assimilating the texture and appearance of paper may vary in color. Further, the sheet of polymeric material 10 or a laminated material may be provided with other decorative patterns or designs in addition to the matting, texturing, flocking, application of lacquers or foamable inks, or embossing employed to impart a paper-like texture and appearance to the sheet of polymeric material 10 or the laminated material.

As illustrated in FIG. 3, the sheet of polymeric material 10 has a width 30 extending generally between the first side 20 and the second side 22, respectively, sufficiently sized whereby the sheet of polymeric material 10 can be wrapped about and encompass a floral grouping or a flower pot. The sheet of polymeric material 10 has a length 32 extending generally between the third side 24 and the fourth side 26, respectively, sufficiently sized whereby the sheet of polymeric material 10 extends over a substantial portion of the floral grouping when the sheet of polymeric material 10 has been wrapped about the floral grouping in accordance with the present invention, as described in detail herein. The sheet of polymeric material 10 may also be wrapped about a flower pot to substantially wrap and cover the flower pot in accordance with the present invention.

A plurality of sheets of polymeric material 10 having a texture and appearance assimilating the texture and appearance of paper may be connected together to form a roll as is shown in U.S. Pat. No. 5,459,976, issued Oct. 24, 1995, entitled "MATERIAL AND ADHESIVE STRIP DISPENSER", the specification of which is hereby expressly incorporated in its entirety herein by reference.

FIGS. 3–5 illustrate the use of the sheet of polymeric material 10 having a texture and appearance assimilating the texture and appearance of paper for wrapping a floral grouping 34 to provide a decorative cover 36 having a texture and appearance assimilating paper (FIG. 5) for the floral grouping 34. The sheet of polymeric material 10 may optionally have the strip of bonding material 27 disposed upon the upper surface 14, the lower surface 16 or both, such as the strip of bonding material 27 disposed along at least a portion of the upper surface 14 of the sheet of polymeric material 10 so that the strip of bonding material 27 is disposed substantially adjacent the fourth side 26 thereof substantially as shown in FIGS. 3 and 4. Further, the sheet of polymeric material 10 having a texture and appearance assimilating the texture and appearance of paper can be provided either as an individual sheet or from a pad or roll of material.

The bonding material 27, if present, may have a backing or release strip (not shown). The backing or release strip may be left applied for a period of time to the bonding material 27 after it is disposed on a surface of the sheet of polymeric material 10 prior to its use as a wrapping material in order to protect the bonding qualities of the bonding strip.

In operation, an operator may dispose the sheet of polymeric material 10 having a texture and appearance assimilating the texture and appearance of paper on a support surface (not shown) whereby the lower surface 16 of the sheet of polymeric material 10 (which has been modified to provide the sheet of polymeric material 10 with a texture and appearance assimilating the texture and appearance of paper) contacts the support surface. Referring more specifically to FIGS. 3–5, the floral grouping 34 is placed upon the upper surface 14 of the sheet of material 10 in a diagonal orientation. The floral grouping 34 has an upper bloom or foliage portion 42 and a lower stem portion 44. The sheet of polymeric material 10 is then wrapped about the floral grouping 34 by the operator (FIGS. 4 and 5), the operator overlapping a portion of the sheet of polymeric material 10 over another portion of the sheet of polymeric material 10. That is, for example, the operator places the first side 20 of the sheet of polymeric material 10 over the floral grouping 34, as shown in FIG. 4. The operator continues to roll the floral grouping 34 and the sheet of polymeric material 10 in the direction toward the second side 22 of the sheet of polymeric material 10 until the upper surface 14 near second side 22 firmly engages the lower surface 16 of the sheet of polymeric material 10, wherein the floral grouping 34 is substantially encompassed by the sheet of polymeric material 10, and wherein the bonding material 27 contacts the sheet of polymeric material 10 to provide the decorative cover 36 having a texture and appearance assimilating the texture and appearance of paper which substantially encompasses and surrounds a substantial portion of the floral grouping 34. FIG. 5 shows the floral grouping 34 wrapped in a conical fashion to provide the decorative cover 36 for the floral grouping 34 wherein the decorative cover 36 has a texture and appearance assimilating paper. When the floral grouping 34 is wrapped in a conical fashion, the bloom end 42 of the floral grouping 34 is exposed near the open upper end of the decorative cover 36 and the stem end 44 exposed near the lower-end of the decorative cover 36.

Figure 6:
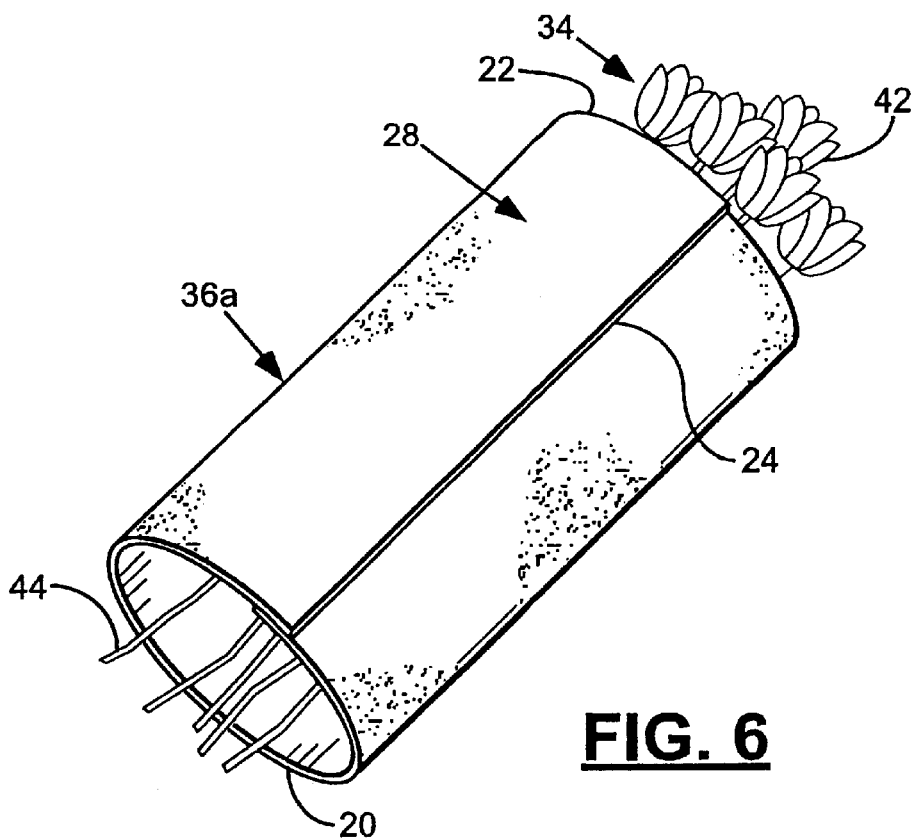
FIG. 6 is a perspective view of a decorative cover for the floral grouping formed from a sheet of polymeric material having a texture and appearance assimilating paper of FIG. 2 wherein the decorative cover has a substantially cylindrical configuration.

In another embodiment, illustrated in FIG. 6, the sheet of polymeric material 10 having a texture and appearance assimilating paper in texture and appearance is utilized to wrap the floral grouping 34 in a cylindrical fashion. The floral grouping 34 is disposed upon the sheet of polymeric material 10 approximately parallel to side 24 of the sheet of polymeric material 10. The sheet of polymeric material 10 is wrapped generally about the stem portion 44 of the floral grouping 34 to a position wherein the third side 24 of the sheet of polymeric material 10 generally overlaps the fourth side 26 of the sheet of polymeric material 10 in a cylindrical fashion. It should be noted that the sheet of polymeric material 10 may be wrapped a plurality of times about the stem portion 44 of the floral grouping 34 before the overlapping of the third side 24 and the fourth side 26 of the sheet of material 10. As before, the portion of the sheet of material 10 near the third side 26 is disposed generally adjacent another portion of the sheet of material 10 and the two adjacent portions then are brought into contact where they may be bondingly engaged, thereby securing the sheet of polymeric material 10 generally about the floral grouping 34 so as to provide a decorative cover 36a having a texture and appearance assimilating paper for the floral grouping 34.

Figure 7:
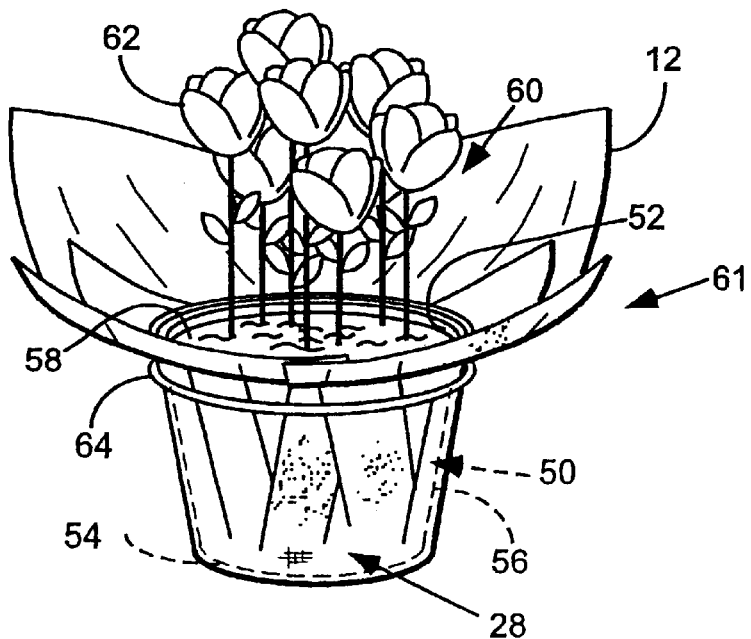
FIG. 7 is a perspective view of a decorative cover positioned about a flower pot wherein the decorative cover is formed from a sheet of the polymeric material having a texture and appearance assimilating paper of FIG. 1.

In another version of the invention, the sheet of polymeric material 10 having a texture and appearance assimilating the texture and appearance of paper may be used to wrap a flower pot or pot-type container, as noted above. Shown in FIG. 7 is a flower pot designated by the reference numeral 50 having an open upper end 52, a bottom end 54, an outer peripheral surface 56, an inner retaining space 58 within which may be disposed a growing medium. The flower pot 50 may contain a botanical item, such as a plant 60, which has an upper portion 62 comprising blooms or foliage or both.

The sheet of polymeric material 10 having a texture and appearance assimilating the texture and appearance of paper may be wrapped about the flower pot 50 by any one of numerous methods used to wrap sheets of material about flower pots to form decorative pot covers for flower pots, such as a decorative cover 61 having a texture and appearance assimilating the texture and appearance of paper disposed about the flower pot 50 illustrated in FIG. 7. The sheet of polymeric material 10 having a texture and appearance assimilating paper may, for example, be formed by hand about the outer peripheral surface 56 of the flower pot 50 to produce the decorative cover 61 which has the appearance of being fabricated of paper. The decorative cover 61 can then be secured about the flower pot 50 by a bonding means or by an elastic band 64 such that the open upper end 52 of the flower pot 50 remains substantially uncovered by the decorative cover 61 substantially as shown in FIG. 7.

Figure 8:
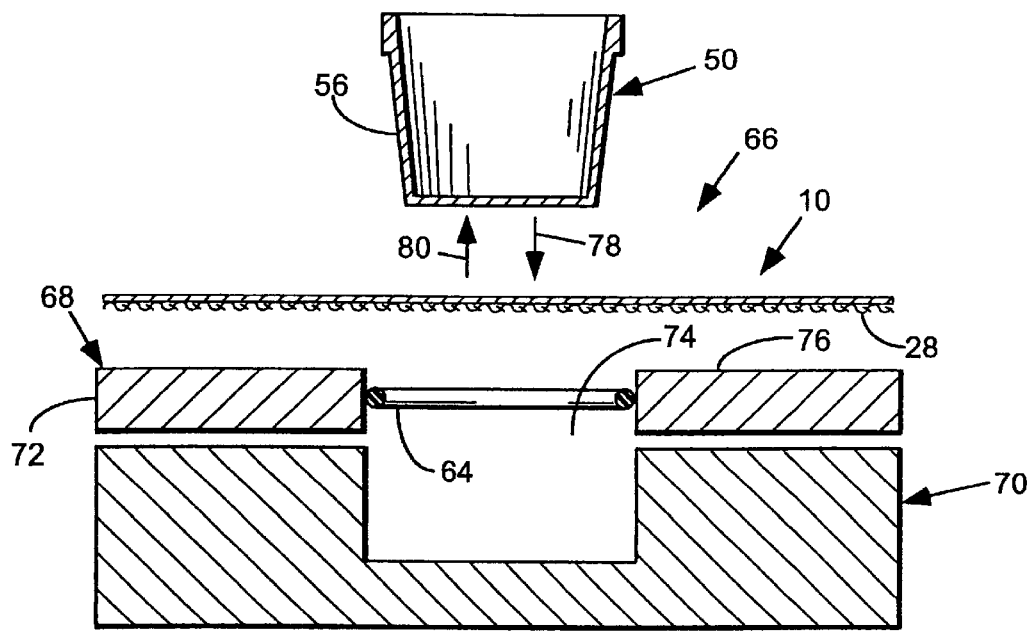
FIG. 8 is a cross-sectional view of a flower pot cover former and band applicator apparatus having a sheet of the polymeric material having a texture and appearance assimilating paper of FIG. 1 disposed above an opening of the flower pot cover former and band applicator and having a flower pot disposed above the sheet of polymeric material having a texture and appearance assimilating paper.

Referring now to FIG. 8, a flower pot cover former and band applicator apparatus 66 for forming the sheet of polymeric material 10 having a texture and appearance assimilating the texture and appearance of paper into the decorative cover 61 for the flower pot 50 of FIG. 7 is illustrated. The flower pot cover former and band applicator device 66 comprises a band applicator 68 and a flower pot cover former 70. The flower pot cover former and band applicator device 66 has a support platform 72 with an opening 74 formed therein. A band, such as elastic band 64, is disposed circumferentially about the opening 74 in the support platform 72.

The lower surface 16 of the sheet of polymeric material 10 (which has been modified to provide the sheet of polymeric material 10 with a textured or matted surface assimilating paper in appearance) is positioned on an upper surface 76 on the support platform 72 such that the sheet of polymeric material 10 is positioned over the opening 74 in the support platform 72. The flower pot 50 is positioned above the sheet of polymeric material 10 and is moved in a direction 78 into the opening 74 of the flower pot cover former and band applicator device 66. As the flower pot 50 is moved into the opening 74, the sheet of polymeric material 10 is pressed about the outer peripheral surface 56 of the flower pot 50 thereby forming the decorative cover 61 having a texture and appearance assimilating paper about the flower pot 50. The decorative cover 61, which has a texture and appearance assimilating the texture and appearance of paper, is then secured about the flower pot 50 by the elastic band 64. The flower pot 50 having the decorative cover 61 secured thereto is then moved in a direction 80 out of the opening 74 in the support platform 72.

The elastic band 64 can be applied manually or automatically such as by the method shown in U.S. Pat. No. 5,105,599 which is hereby incorporated herein by reference. The band 64 can also be applied as a tie using a method such as described in "Single Station Covering and Fastening System", U.S. Pat. No. 5,609,009, the specification of which is hereby incorporated herein by reference. The sheet of polymeric material 10 having a texture and appearance assimilating the texture and appearance of paper can also be applied automatically about the pot 60, for example, by methods shown in U.S. Pat. Nos. 4,733,521 and 5,291,721, both of which are hereby incorporated herein by reference.

Instead of securing the decorative cover 61 about the flower pot 50 via the band 64, the decorative cover 61 formed from the sheet of polymeric material 10 having a texture and appearance assimilating the texture and appearance of paper may be secured to the flower pot 50 by the use of one or more bonding materials. For example, the upper surface 14 of the sheet of polymeric material 10 may have a bonding material such as bonding material 27 disposed upon a portion thereof. When the sheet of polymeric material 10 is disposed about the flower pot 50, at least a portion of the upper surface 14 of the sheet of polymeric material 10 contacts the outer peripheral surface 56 of the flower pot 50 and is thereby bonded and held about the flower pot 50 via the bonding material.

The bonding material may cover a portion of the upper surface 14 of the sheet of polymeric material 10 or the bonding material may entirely cover the upper surface 14 of the sheet of polymeric material 10. The bonding material may be disposed on the upper surface 14 of the sheet of polymeric material 10 in the form of a strip or in the form of spaced-apart spots. One, method for disposing a bonding material on the sheet of polymeric material 10 is described in U.S. Pat. No. 5,111,637, entitled "Method For Wrapping A Floral Grouping", issued to Weder, et al. on May 12, 1992, which is expressly incorporated herein by reference.

The term "bonding material" when used herein can mean an adhesive, frequently a pressure sensitive adhesive, or a cohesive or any adhesive/cohesive combination, having adhesive qualities (i.e., qualities of adhesion or adhesion/cohesion, respectively) sufficient to cause the attachment of a portion of the sheet of polymeric material 10 to itself, to a floral grouping, or to a flower pot. Since the bonding material may comprise either an adhesive or an adhesive/cohesive combination, it will be appreciated that both adhesives and cohesives are known in the art, and both are commercially available. When the bonding material is a cohesive, a similar cohesive material must be placed on the adjacent surface for bondingly contacting and bondingly engaging with the cohesive material.

The term "bonding material" also includes materials which are heat sealable and, in this instance, the adjacent portions of the material must be brought into contact and then heat must be applied to effect the seal. The term "bonding material" also includes materials which are sonically sealable and vibratory sealable. The term "bonding material" when used herein also means a heat sealing lacquer or hot melt material which may be applied to the material and, in this instance, heat, sound waves, or vibrations, also must be applied to effect the sealing.

The term "bonding material" when used herein also means any type of material or thing which can be used to effect the bonding or connecting of the two adjacent portions of the sheet of polymeric material 10 to effect the connection or bonding described herein. The term "bonding material" may also include ties, labels, bands, ribbons, strings, tapes (including single or double-sided adhesive tapes), staples or combinations thereof. Some of the bonding materials would secure the ends of the material while other bonding material may bind the circumference of a wrapper, or a sleeve, or, alternatively and/or in addition, the bonding materials would secure overlapping folds in the material and/or sleeve. Another way to secure the wrapping and/or sleeve is to heat seal the ends of the material to another portion of the material. One way to do this is to contact the ends with an iron of sufficient heat to heat seal the material.

Alternatively, a cold seal adhesive may be utilized as the bonding material. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material" when used herein also means any heat or chemically shrinkable material, and static electrical or other electrical means, chemical welding means, magnetic means, mechanical or barb-type fastening means or clamps, curl-type characteristics of the film or materials incorporated in material which can cause the material to take on certain shapes, cling films, slots, grooves, shrinkable materials and bands, curl, materials, springs, and any type of welding method which may weld portions of the material to itself or to the pot, or to both the material itself and the pot.

Description of FIGS. 9–12

Figure 10:
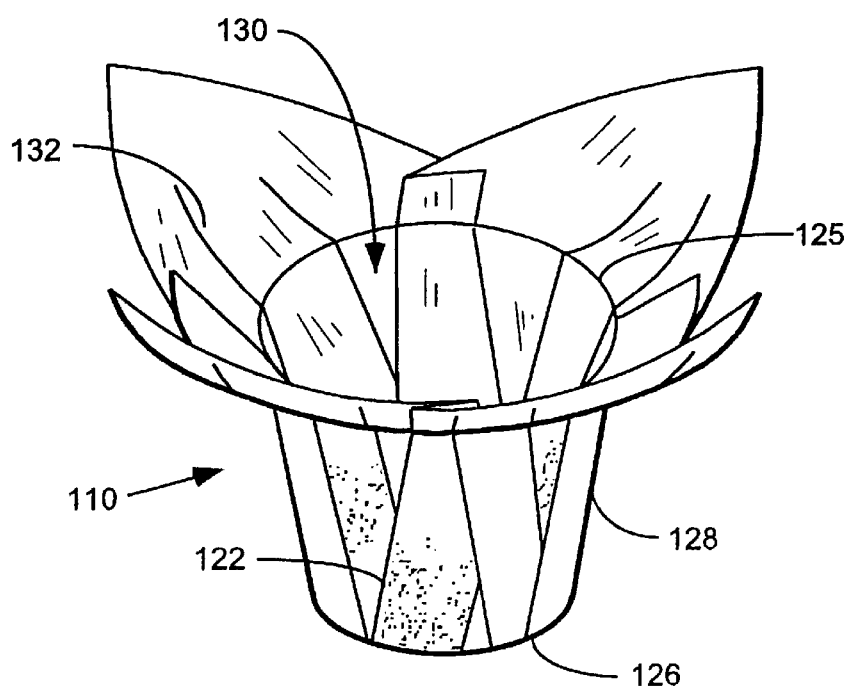
FIG. 10 is a perspective view of a preformed pot cover formed from a sheet of polymeric material having a texture and appearance assimilating paper.
Figure 11:
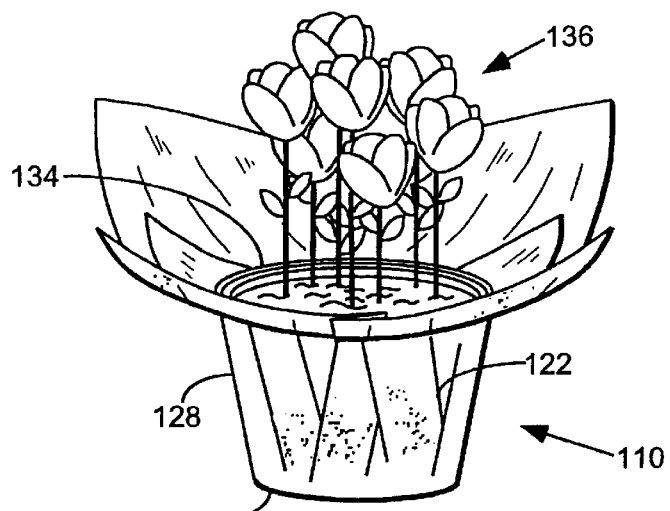
FIG. 11 is a perspective view of the preformed pot cover of FIG. 10 having a flower pot disposed therein.

Referring now to FIGS. 10 and 11, a decorative preformed flower pot cover 110 is illustrated constructed from a sheet of polymeric material having at least one surface thereof textured or modified to provide the sheet of polymeric material with a texture and appearance assimilating the texture and appearance of paper. The polymeric material having a texture and appearance assimilating the texture and appearance of paper is a flexible material such as the sheet of polymeric material 10 having a texture and appearance assimilating the texture and appearance of paper, or a flexible material 112 having a texture and appearance assimilating the texture and appearance of paper (FIG. 9A) or a flexible laminated sheet of material 112a having a texture and appearance assimilating the texture and appearance of paper (FIG. 9B). In the embodiment shown in FIG. 9A, the sheet of flexible material 112 having a texture and appearance assimilating the texture and appearance of paper used in the construction of the preformed flower pot cover 110 comprises a sheet of expanded core polymeric material 114 having an upper surface 116, a lower surface 118 and a thickness in the range of from about 0.5 to about 10 mils, more desirably in the range of from about 0.6 to about 1.25 mils. The sheet of expanded core polymeric material 114 is provided with a coating of an acrylic heat sealable lacquer 120 disposed on at least one of the upper and lower surfaces 116 and 118 thereof. It should be understood, however, that the sheet of flexible material 112 is not limited to being the expanded core polymeric film 114 having a texture and appearance assimilating the texture and appearance of paper; rather, the sheet of flexible material 112 can be any flexible polymeric material or flexible laminated material, such as the polymeric material 10 or the laminated polymeric material 112a, which can be modified or textured so that at least one surface of such polymeric material or laminated material is provided with a finish or texture assimilating paper in appearance.

As previously stated, the modification of the polymeric material or laminated polymeric material, such as the polymeric material 10, the laminated polymeric material 112a, or the expanded core polymeric film 114 to provide the sheet of flexible material with the desired matt or textured finish, can be accomplished by printing a desired pattern on the sheet of polymeric material and thereafter laminating a matt material, such as a translucent polymeric film over the printed pattern. To further enhance the texture and appearance of the sheet of polymeric material so that the sheet of polymeric material assimilates the texture and appearance of paper, the matt material may or may not have a plurality of spatially disposed holes extending therethrough. A matt or textured finish can also be produced by printing a sheet of polymeric material with a matted (i.e. dull finish) ink, by lacquering at least one surface of the sheet of polymeric material with a dull finish lacquer or a matting lacquer, by embossing the sheet of polymeric material to provide an embossed pattern assimilating the texture and appearance of paper, or by embossing and printing the sheet of polymeric material to provide embossed and printed patterns wherein the embossed and printed patterns may be in registry, out of registry or wherein a portion of the embossed and printed patterns are in registry and a portion of the embossed and printed patterns are out of registry. In addition, a matt or textured finish capable a providing the sheet of flexible polymeric material with a texture and appearance assimilating the texture and appearance of paper can be achieved by extruding a polymeric resin onto a matted or textured chill roll to produce the expanded core polymeric material, or by laminating a second sheet of material to the sheet of polymeric material, or by the use of selected pigments.

The sheet of flexible material 112 (FIG. 9A) having a texture and appearance assimilating the texture and appearance of paper may vary in color. Further, the sheet of flexible material 112 may be provided with other decorative patterns or designs in addition to the matting, texturing, flocking, application of lacquers or foamable inks, or embossing employed to impart a texture and appearance assimilating the texture and appearance of paper to the sheet of flexible material 112.

When the sheet of polymeric material, such as the sheet of flexible polymeric material 112 is formed into the preformed flower pot cover 110, a plurality of overlapping folds 122 are formed and at least a portion of the overlapping folds 122 are connected to adjacently disposed portions of the preformed flower pot cover 110 via the acrylic heat sealable lacquer 120.

As shown in FIGS. 10 and 11, the decorative preformed pot cover 122 has an upper end 125, a lower end 126, and an outer peripheral surface 128. An opening 130 intersects the upper end 125, forming an inner peripheral surface 132 which defines and encompasses a retaining space within which a flower pot 134 containing a floral grouping 136 may be disposed in a manner well known in the art.

In another embodiment, a sheet of flexible material 112a (FIG. 9B) is used in the construction of the preformed flower pot cover 110. The sheet of flexible material 112a is a laminated material which comprises a first sheet of material 114a having an upper surface 116a, a lower surface 118a and a second sheet of material 120a. At least one surface of the first sheet of material 114a or the second sheet of material 120a is modified to provide the sheet of flexible material 112a with the desired texture and appearance assimilating the texture and appearance of paper. The laminated material having a texture and appearance assimilating the texture and appearance of paper can be produced by laminating two or more sheets of polymeric film (such as two or more sheets of polypropylene film or a sheet of polypropylene film and a sheet of expanded core polymeric film, such as expanded core polypropylene film), or by laminating a polymeric film (such as polypropylene film or an expanded core polymeric film) with a sheet of metallized foil and the like wherein at least one surface of the laminated material is textured or modified to assimilate paper in appearance.

The first sheet of material 114a desirably has a thickness of from about 0.5 mil to about 10 mils, and more desirably from about 0.6 mil to about 1.25 mils, and the second sheet of material 120 desirably has a thickness of from about 0.5 mil to about 10 mils, and more desirably from about 0.6 mil to about 1.25 mils. The second sheet or material 120 can be laminated to the first sheet of material 114a with a colored adhesive so as to impart a desired color to the laminated sheet of flexible material 112a. While the thickness of the sheet of flexible material 112a can vary widely and will generally depend on the thickness of the first sheet of material 114a and the thickness of the second sheet of material 120, desirable results can be obtained where the sheet of flexible material 112a has a thickness in the range of from about 1 mil to about 20 mils, and more desirably from about 1.2 mils to about 2.5 mils.

As previously stated, the preformed flower pot cover 110 may be constructed of the sheet of polymeric material 10 having a texture and appearance assimilating the texture and appearance of paper (FIG. 1), or of the sheet of the flexible material 112 (FIG. 9A), or of the laminated sheet of the flexible material 112a (FIG. 9B). The preformed flower pot cover 110 so formed will have a plurality of overlapping folds formed therein, at least a portion thereof being connected. If desired, the preformed flower pot cover 110 can be formed of a plurality of sheets of the same and/or different types of material.

The method and apparatus employed to form the preformed flower pot cover 110 having a texture and appearance of paper is substantially identical whether one uses one or more sheets of the Polymeric material 10 (FIG. 1), or one or more sheets of the flexible polymeric material 112 (FIG. 9A), or one or more sheets of the flexible material 112a (FIG. 9B), or a combination of such sheets of material. Thus, only the formation of the preformed flower pot cover 110 having a texture and appearance of paper using a sheet of the flexible polymeric material 112 of FIG. 9A will be described in detail hereinafter.

Figure 12:
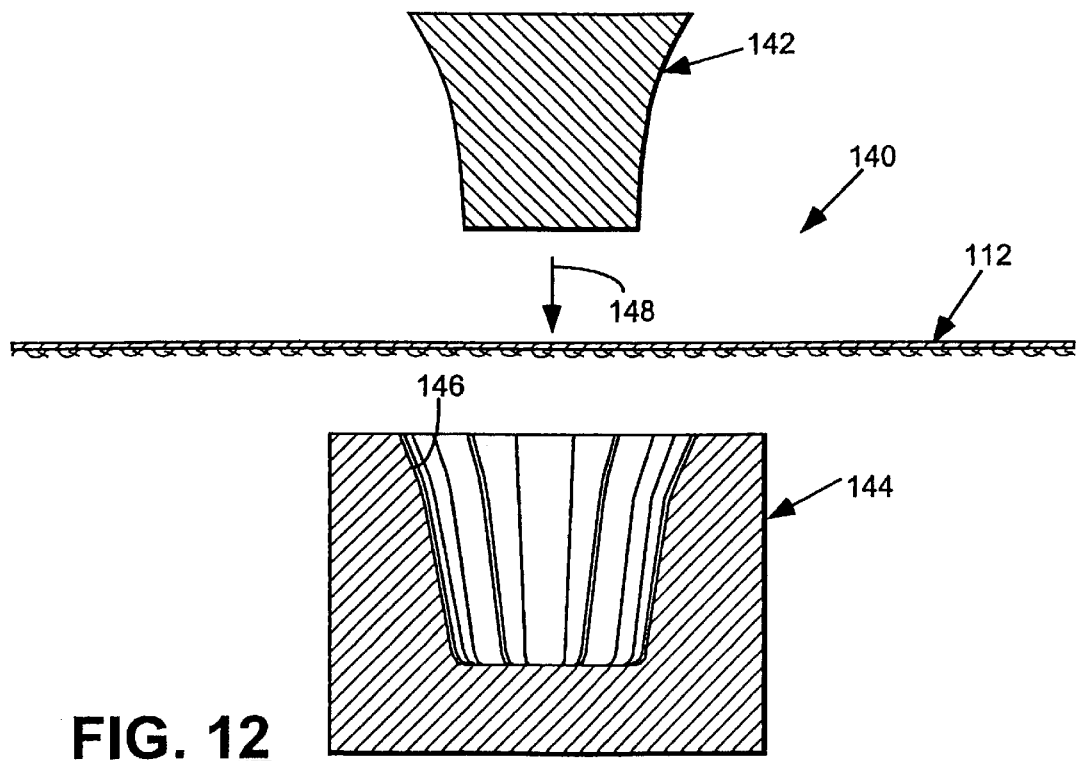
FIG. 12 is a diagrammatic, cross-sectional view of a male and female mold having a sheet of polymeric material having a texture and appearance assimilating paper disposed therebetween for forming the preformed pot cover of FIG. 10.

The decorative preformed flower pot cover 122 may be formed using a conventional mold system 140 comprising a male mold 142 and a female mold 144 having a mold cavity 146 for matingly receiving the male mold 142 (FIG. 12). The sheet of flexible polymeric material 112 having an texture and appearance assimilating the texture and appearance of paper is positioned between the male and female molds 142 and 144, respectively. Movement of the male mold 142 in the direction 148 and into the mold cavity 146 forces the sheet of flexible polymeric material 112 to be disposed about the portion of the male mold 142 disposed in the mold cavity 146 of the female mold 146 and thereby forms the sheet of polymeric material 112 into the preformed decorative flower pot cover 110 having a texture and appearance assimilating the texture and appearance of paper (FIGS. 10 and 11). Further, in accordance with the present invention, the preformed flower pot cover 110 constructed from the materials described herein above, may have a bonding means or material disposed upon a portion thereof.

Methods for forming such preformed decorative pot covers are well known in the art. Two methods of forming such covers are described in U.S. Pat. Nos. 4,773,182 and 5,291,721, each of which is expressly incorporated herein by reference.

Description of FIGS. 13–19

Figure 13:
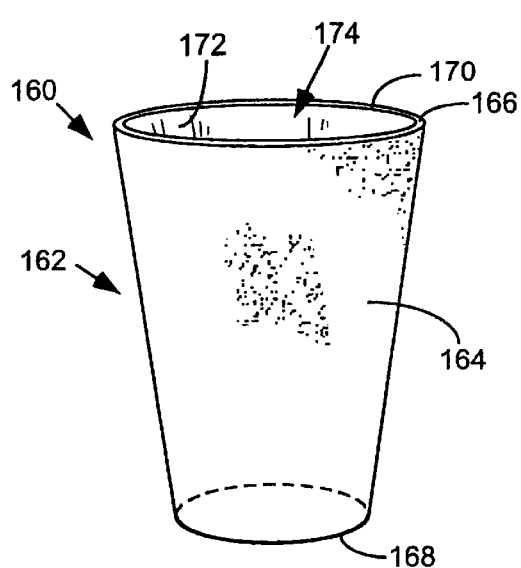
FIG. 13 is a perspective view of a floral sleeve formed from a sheet of the polymeric material having a texture and appearance assimilating paper.

Shown in FIG. 13 is a decorative cover designated therein by the general reference numeral 160 which comprises a flexible bag or sleeve 162 of unitary construction having a texture and appearance assimilating the texture and appearance of paper in accordance with the present invention. The sleeve 162 may be used as a decorative cover for a floral grouping or a flower pot. The sleeve 162 initially comprises a flexible flat collapsed piece of polymeric material which is openable in the form of a tube or sleeve. Such sleeves are well known in the floral industry. Further, in accordance with the present invention, the decorative cover 160 can be constructed of the flexible polymeric material 10 (FIG. 1), or the flexible polymeric material 112 (FIG. 9A), or the laminated flexible polymeric material 112a (FIG. 9B) whereby at least a portion of one, surface of the sleeve 162, preferably an outer peripheral surface 164 of the sleeve 162, has been modified to provide with sleeve 162, with a texture and appearance assimilating the texture and appearance of paper, as previously described herein.

The sleeve 162 has an upper end 166, a lower end 168 and the outer peripheral surface 164. The sleeve 162 may be tapered outwardly from the lower end 168 toward a larger diameter at its upper end 166. In its flattened state the sleeve 162 generally has an overall trapezoidal or modified trapezoidal shape, and when opened is substantially frusto-conical in configuration. It will be appreciated, however, that the sleeve 162 may comprise variations on the aforementioned shapes or may comprise significantly altered shapes such as square or rectangular, wherein the sleeve 162 when opened has a cylindrical form, as long as the sleeve 162 functions in accordance with the present invention in the manner described herein. The sleeve 162 (or any other sleeve disclosed herein) may have an angular or contoured shape.

The sleeve 162 has an opening 170 at the upper end 166 and may be open at the lower end 168, or closed with a bottom at the lower end 168. The sleeve 162 also has an inner peripheral surface 172 which, when the sleeve 162 is opened, defines and encompasses an inner retaining space 174. When the lower end 168 of the sleeve 162 has a closed lower end 168, a portion of the lower end 168 may be inwardly folded to form one or more gussets (not shown) for allowing the lower portion of the inner retaining space 174 to be expandable, for example, for receiving the circular bottom of a pot or growing medium.

The sleeve 162 is generally frusto-conically shaped, but the sleeve 162 may be, by way of example but not by way of limitation, cylindrical, frusto-conical, a combination of both frusto-conical and cylindrical, or any other shape, as long as the sleeve 162 functions as described herein as noted above. Further, the sleeve 162 may comprise any shape, whether geometric, non-geometric, asymmetrical and/or fanciful as long as it functions in accordance with the present invention. The sleeve 162 may also be equipped with drain holes (if having a closed bottom) or side ventilation holes (not shown), or can be made from gas permeable or impermeable materials.

The material from which the sleeve 162 is constructed is the same as previously described above for the sheet of polymeric material 10 having a texture and appearance assimilating the texture and appearance of paper, or the sheet of polymeric material 112 or 112a having a texture and appearance assimilating paper. Any thickness of polymeric material may be utilized in accordance with the present invention as long as the sleeve 162 may be formed as described herein, is provided with a texture and appearance assimilating the texture and appearance of paper, and as long as the formed sleeve 162 may contain at least a portion of a flower pot or a floral grouping, as described herein. Additionally, an insulating material such as bubble film, preferable as one of two or more layers, can be utilized in order to provide additional protection for the item, such as a floral grouping, contained therein.

Figure 14:
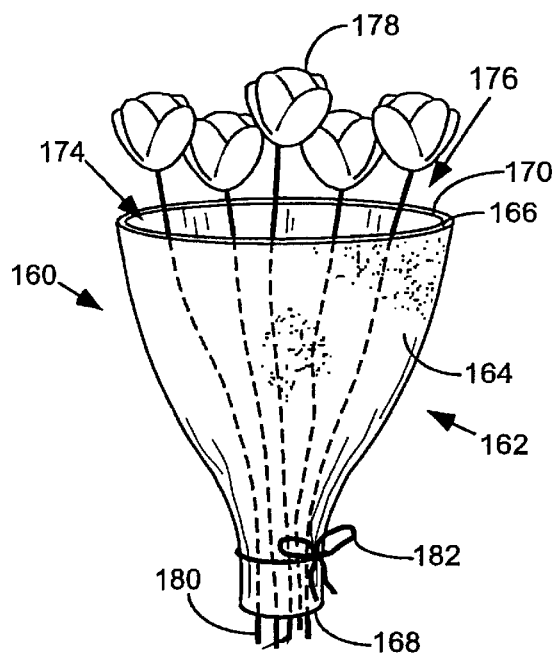
FIG. 14 is a perspective view of the floral sleeve of FIG. 13 disposed about a floral grouping.
Figure 15:
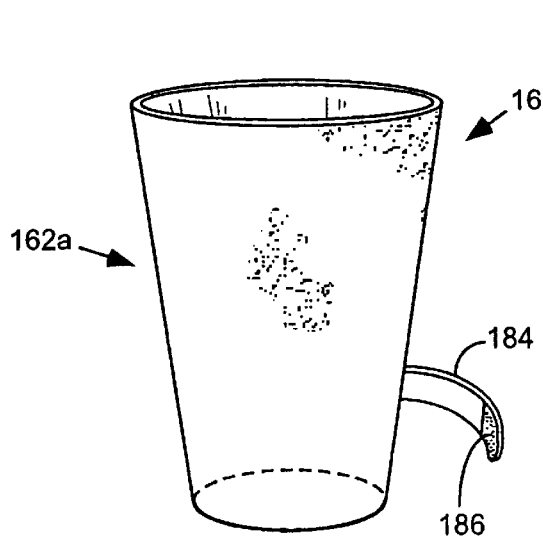
FIG. 15 is a perspective view of a floral sleeve having a cinching member wherein the floral sleeve is formed from a sheet of polymeric material having a texture and appearance assimilating paper.
Figure 16:
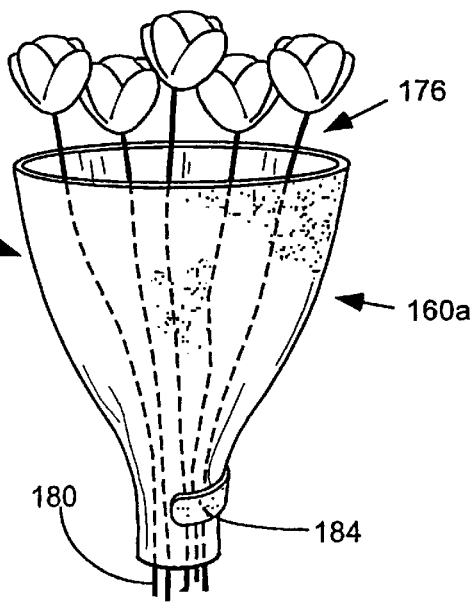
FIG. 16 is a perspective view of the floral sleeve of FIG. 15 disposed about a floral grouping.

In FIG. 14 the sleeve 162 is illustrated having a texture and appearance assimilating the texture and appearance of paper provided on the outer peripheral surface 184 of the sleeve 162. A floral grouping 176 is disposed within the inner retaining space 174 of the sleeve 162. Generally, an upper or bloom portion 178 of the floral grouping 176 is exposed near the opening 170 of the sleeve 162 and a lower or stem portion 180 of the floral grouping 176 is exposed near the lower end 168 of the sleeve 162. Either end of the sleeve 162 may be closed about the floral grouping 176. Generally, a portion of the sleeve 162 is tightened about a portion of the stem portion 180 of the floral grouping 176 for holding the decorative cover 160 about the floral grouping 176. For example, the sleeve 162 may be held by a tie 182 tied about the sleeve 162 such as is shown in FIG. 14. Other means for binding the sleeve 162 about the floral grouping 176 may be employed such as the bonding materials described elsewhere herein. For example, as shown in FIG. 15, a decorative cover 160a is shown which comprises a sleeve 162a having a texture and appearance assimilating the texture and appearance of paper and a cinching tab 184 having a bonding material 186 disposed upon a surface thereof. The cinching tab 184 can be used to gather portions of the sleeve 162a together about the stem portion 180 of the floral grouping 176 as shown in FIG. 16 for holding the sleeve 162a tightly about the floral grouping 176.

Similarly, it may generally be desired to use the sleeve 162 as a decorative cover for a flower pot (not shown). The flower pot will generally contain a botanical item or plant. The flower pot can be deposited into the open sleeve 162 in a manner well known in the art, such as manually wherein the sleeve 162 is opened by hand and the flower pot deposited therein.

As noted above, a bonding material may be disposed on a portion of the sleeve 162 or any sleeve described herein to assist in holding the sleeve 162 to the flower pot when the flower pot is disposed within the sleeve 162 or to assist in closing the upper end 166 of the sleeve 162 or adhering the sleeve 162 to the flower pot after the flower pot has been disposed therein, as will be discussed in further detail below.

It will be understood that the bonding material, if present, may be disposed as a strip or block on a surface of the sleeve 62. The bonding material may also be disposed upon either the outer peripheral surface 164 or the inner peripheral surface 162 of the sleeve 162, as well as upon the flower pot. Further, the bonding material may be disposed as spots of bonding material, or in any other geometric, non-geometric, asymmetric, or fanciful form, and in any pattern including covering either the entire inner peripheral surface 172 and/or outer peripheral surface 164 of the sleeve 162 and/or the flower pot. The bonding material may be covered by a cover or release strip which can be removed prior to the use of the sleeve 162 or flower pot. The bonding material can be applied by means known to those of ordinary skill in their art. One method for disposing a bonding material, in this case an adhesive, is described in U.S. Pat. No. 5,111,637, which is hereby incorporated herein by reference.

As noted above, a bonding material may be disposed on at least a portion of the inner peripheral surface 172 of the sleeve 162, or, alternatively, the bonding material may be disposed on the outer peripheral surface of a flower pot contained within the sleeve 162, while the sleeve 162 may be free of the bonding material. In a further alternative, the bonding material may be disposed both on at least a portion of the flower pot as well as upon at least a portion of the inner peripheral surface 172 of the sleeve 162. In addition, a portion of the bonding material may also be disposed on the outer peripheral surface 165 of the sleeve 162 as well. It will be understood that the bonding material may be disposed in a solid section of bonding material. The bonding material, when present, is disposed on the sleeve 162 and/or flower pot by any means known in the art.

Certain versions of sleeves described herein may be used in combination with a preformed pot cover. For example, a preformed pot cover may be applied to the pot, then the covered pot wrapped or disposed within a sleeve. Either the cover or the sleeve, or both, have a texture and appearance assimilating the texture and appearance of paper. Examples of sleeves which may be used in this invention are shown in the specification of U.S. Ser. No. 08/237,078 which is expressly incorporated herein by reference in its entirety. Equipment and devices for forming sleeves are commercially available, and well known in the art.

Figure 17:
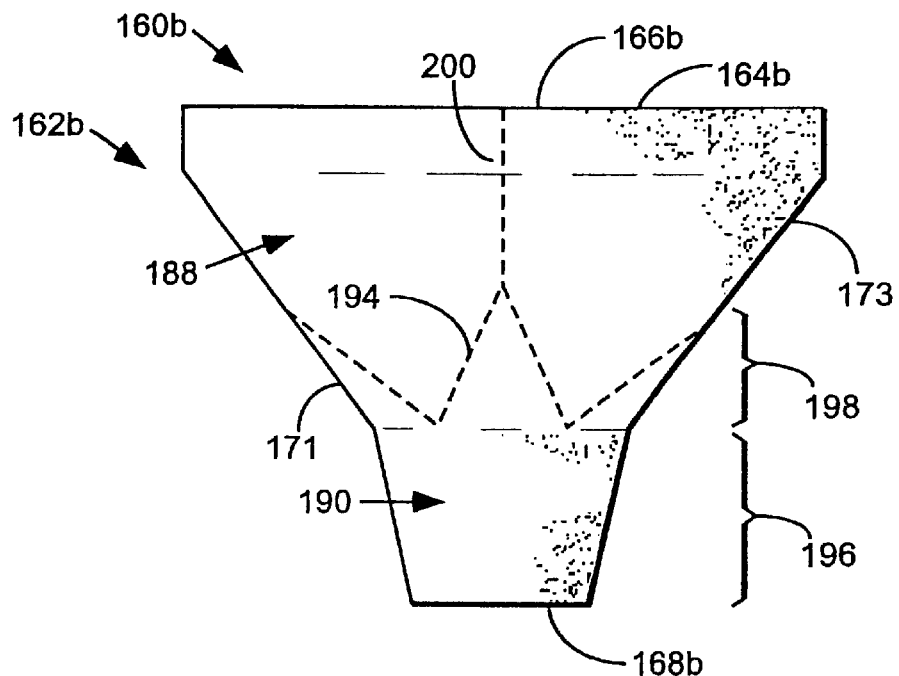
FIG. 17 is a side view of a sleeve having a detachable portion wherein the sleeve is formed from a sheet of polymeric material having a texture and appearance assimilating paper.
Figure 18:
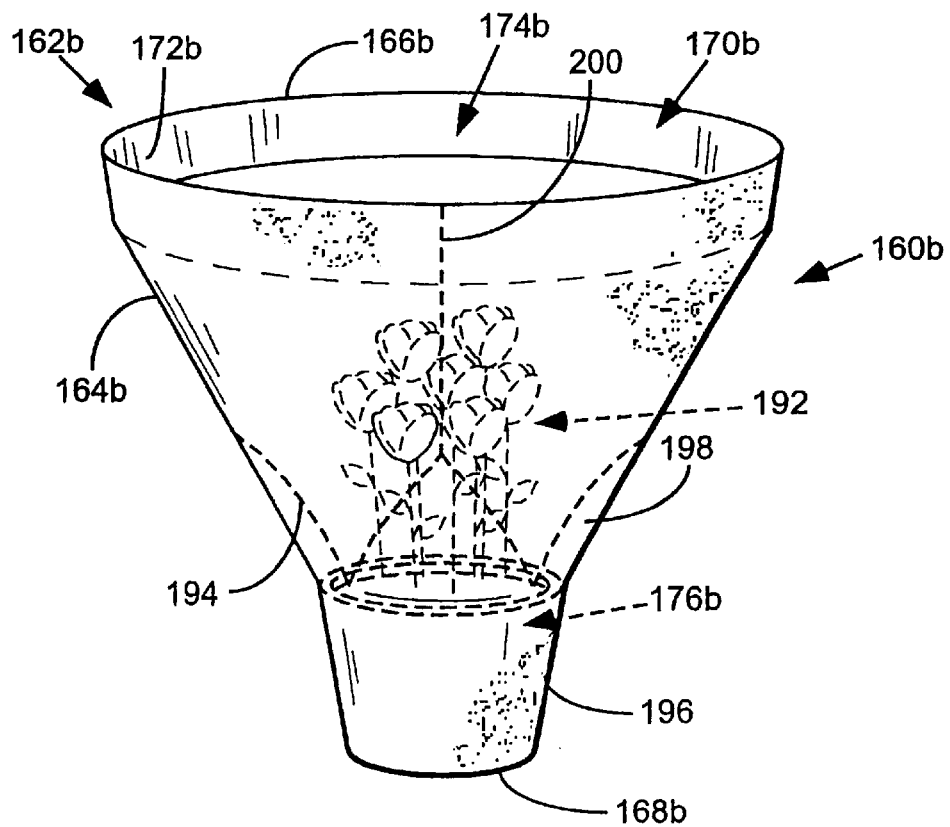
FIG. 18 is a perspective view of the sleeve of FIG. 17 having a flower pot disposed therein.

Shown in FIGS. 17 and 18 is another embodiment of a decorative cover 160b comprising a sleeve having a texture and appearance assimilating the texture and appearance of paper constructed from the polymeric material 10, or the flexible polymeric material 112 or 112a in accordance with the present invention and designated by the general reference numeral 162b. The sleeve 162b has a "detaching" element in predetermined areas for detaching a portion of the sleeve 162b. The sleeve 162b generally initially comprises a flexible flat collapsed piece of material which is openable in the form of a tube or sleeve. The sleeve 162b is constructed of the same material and in the same way as the sleeve 162 described previously herein and may be described exactly the same as the sleeve 162 described herein except for the additional elements described hereinafter.

The sleeve 162b has an upper end 166b, a lower end 168b, and an outer peripheral surface 164b. The sleeve 162b has an opening 170b at the upper end 166b thereof, and the sleeve 162b may be open at the lower end 168b or closed with a bottom at the lower end 168b. In a flattened state, the sleeve 162b has a first side 171 and a second side 173. The sleeve 162b also has an inner peripheral surface 172b which, when the sleeve 162b is opened, defines and encompasses an inner retaining space 174b as shown in FIG. 18. When the lower end 168b of the sleeve 162b has a closed bottom, a portion of the lower end 168b may be inwardly folded to form one or more gussets (not shown) for permitting a circular bottom of an object such as a potted plant 176b to be disposed in the inner retaining space 174b of the lower end 168b of the sleeve 162b.

As shown in FIGS. 17 and 18, the sleeve 162b is demarcated into an upper portion 188 and a lower portion 190. The lower portion 190 of the sleeve 162b is generally sized to contain the flower pot 176b. The upper portion 188 of the sleeve 162b extends upwardly from the flower pot 187 when the flower pot 187 is disposed within the lower portion 190 of the sleeve 162b and is sized to substantially surround and encompass a plant 192 contained in the flower pot 176b disposed within the lower portion 190 of the sleeve 162b. The sleeve 162b is demarcated into the upper portion 188 and the lower portion 190 by a detaching element 194 for enabling the detachment of the upper portion 188 of the sleeve 162b from the lower portion 190 of the sleeve 162b. In the present version, the detaching element 194 is a plurality of generally laterally-oriented or alternatingly diagonally-oriented perforations which extend circumferentially across the outer peripheral surface 164b of the sleeve 162b from the first side 171 to the second side 173.

In the embodiment shown in FIGS. 17 and 18, the lower portion 190 of the sleeve 162b further comprises a base portion 196 and a skirt portion 198. The base portion 196 comprises that part of the lower portion 190 which, when the flower pot 176b is placed into the lower portion 190, has an inner peripheral surface which is substantially adjacent to and surrounds the outer peripheral surface of the flower pot 176b. The skirt portion 198 comprises that part of the lower portion 190 which extends beyond an open upper end of the flower pot 176b and adjacent at least a portion of the plant 192 contained within the flower pot 176b and which is left to freely extend at an angle, inwardly or outwardly, from the base portion 196 when the upper portion 188 of the sleeve 162b is detached from the lower portion 190 of the sleeve 162b by actuation of the detaching element 194.

In the intact sleeve 162b, the skirt portion 198 comprises an upper peripheral edge congruent with the detaching element 194 which is connected to a lower peripheral edge, also congruent with the detaching element 194, of the upper portion 188 of the sleeve 162b. In FIGS. 17 and 18, the upper peripheral edge of the skirt portion 198 is congruent with a series of alternatingly diagonally-oriented lines of perforations which together form a zig-zag and comprise the detaching element 194. The upper portion 188 of the sleeve 162b may also have an additional detaching element 200 indicated as a plurality of vertical perforations for facilitating removal of the upper portion 188 and which are disposed more or less vertically therein extending between the detaching element 194 of the sleeve 162b.

Figure 19:
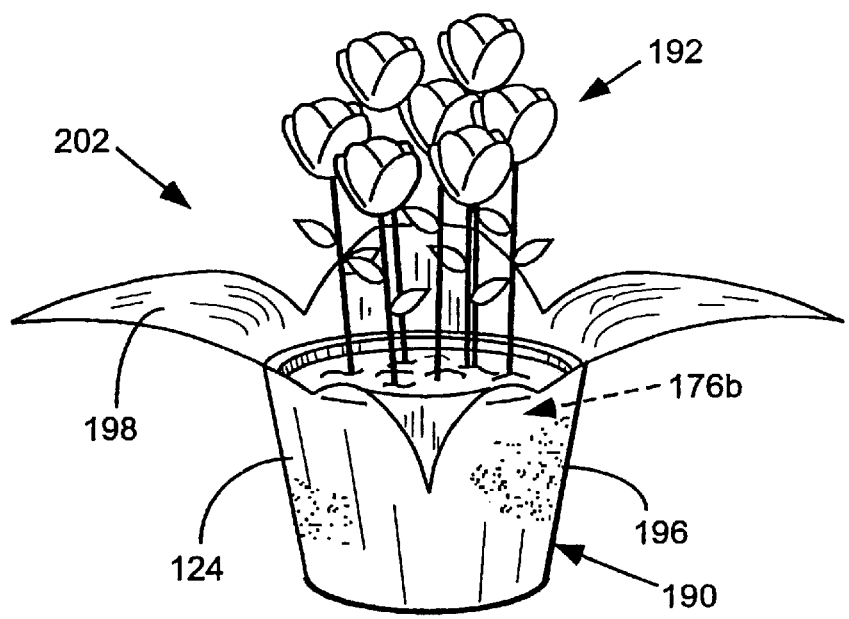
FIG. 19 is a perspective view of a flower pot disposed in the sleeve of FIG. 17 wherein an upper portion of the sleeve has been removed to provide a decorative cover having a skirt.

The upper portion 188 of the sleeve 162b is thereby separable from the lower portion 190 of the sleeve 162b by tearing the upper portion 188 along both the vertical perforations 200 and the detaching element 194, thereby separating the upper portion 188 from the lower portion 190 of the sleeve 162b. The lower portion 190 of the sleeve 162b remains disposed as the base portion 196 about the flower pot 176b and as the skirt portion 198 about the plant 192 forming a decorative cover 202 as shown in FIG. 19 which substantially surrounds and encompasses the flower pot 176b and the plant 192 contained therein. An outer peripheral surface 124 of the lower portion 190 of the sleeve 162b, for example, the base and skirt portions 196 and 198, may be modified to provide the lower portion 190 of the sleeve 162b with a texture and appearance assimilating the texture and appearance of paper, while the upper portion 188 is left unmodified or is printed with a design; or both the upper portion 188 and the lower portion 190 may be provided with a modified or textured surface so the both the upper portion 188 and the lower portion 190 of the sleeve 162 is provided with a texture or appearance assimilating paper. When the upper portion 188 is detached, the lower portion 190 of the sleeve 162b remains about the flower pot 176b and thereby forms a decorative cover about the flower pot 176b which has the appearance of paper.

"Detaching element" or "detaching means" as used herein, means any element, or combination of elements, or features, such as, but not by way of limitation, perforations, tear strips, zippers, and any other devices or elements of this nature known in the art, or any combination thereof. Therefore, while perforations are shown and described in detail herein, it will be understood that tear strips, zippers, or any other "detaching elements" known in the art, or any combination thereof, could be substituted therefor and/or used therewith.

In a general method of use of sleeves 162 and 162b as a decorative cover for a flower pot, an operator provides the sleeve 162 or 162b, and the flower pot 176b having a plant 192 disposed in a growing medium contained within the flower pot 176b. The operator then disposes the flower pot 176b having the plant 192 contained therein into the sleeve 162 or 162b by opening the sleeve 162 or 162b at its first end and assuring both that the opening therein is in an open condition, and that the inner peripheral surface of the sleeve 162 or 162b is somewhat expanded outward as well, as shown in FIG. 18. The operator then manually or automatically disposes the flower pot 176b into the opening in the sleeve 162 or 162b, the flower pot 176b being disposed generally through the upper portion of the sleeve 162 or 162b into generally the lower portion of the sleeve 162 or 162b, the flower pot 176b remaining in the lower portion of the sleeve 162 or 162b, permitting the sleeve 162 or 162b to substantially surround and tightly encompass the flower pot 176b. It will be understood that alternatively, the sleeve 162 or 162b having an extension (not shown), may be utilized, the sleeve 162 or 162b being disposed on rods, or wickets and the flower pot 176b then being disposed in the sleeve 162 or 162b either before or after the sleeve 162 or 162b has been removed from the wickets.

Figure 20A:
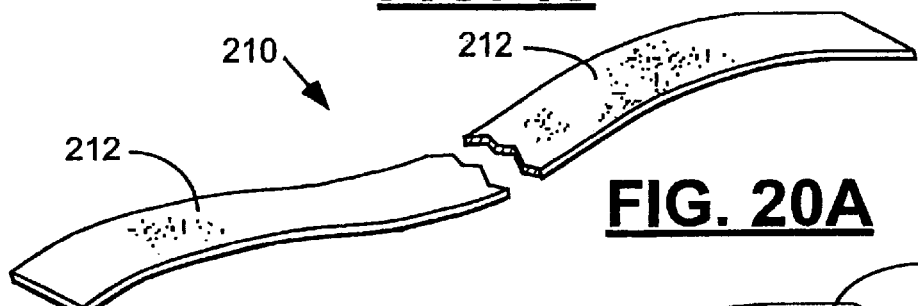
FIG. 20A is a perspective view of a polymeric ribbon material having a texture and appearance assimilating paper.
Figure 20B:
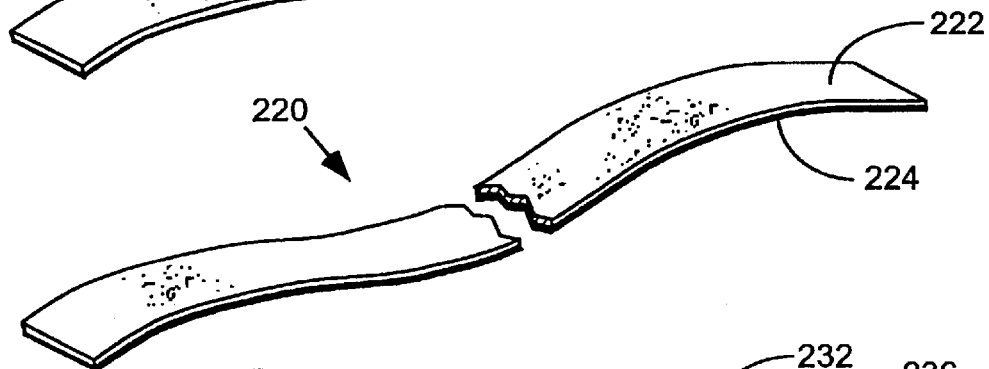
FIG. 20B is a perspective view of a polymeric ribbon material formed of an expanded core polymeric film having a texture and appearance assimilating paper.
Figure 20C:
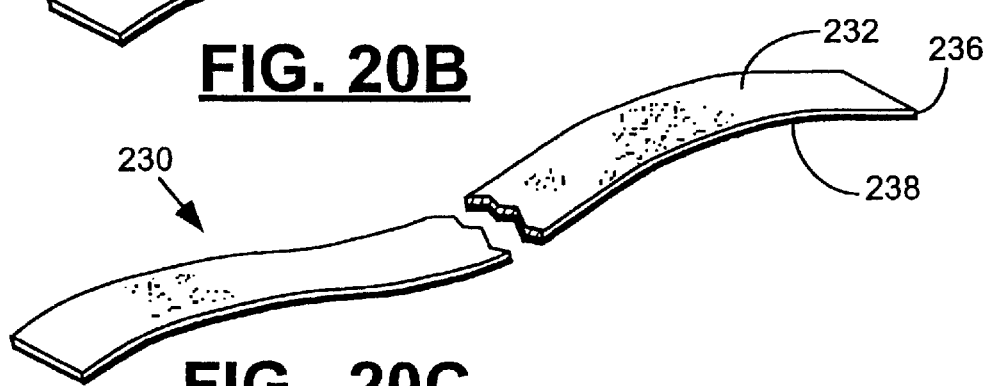
FIG. 20C is a perspective view of a laminated polymeric ribbon wherein at least one surface of the laminated polymeric ribbon is modified or textured to provide the laminated polymeric ribbon with a texture and appearance assimilating paper.

Embodiments of FIGS. 20A–20C

Referring now to FIG. 20A, designated generally by the reference numeral 210 is a polymeric ribbon material having a texture and appearance assimilating the texture and appearance of paper for forming decorative bows and for wrapping items. That is, at least one surface of a web of polymeric material (not shown) is modified to provide a matt or textured finish 212 assimilating the appearance of paper. The modification of the web of polymeric material (not shown) to provide the polymeric ribbon material 210 with a matt or textured finish 212 assimilating paper can be accomplished in several ways. For example, the polymeric ribbon material 210 having the matt or textured finish 212 can be produced by printing a web of polymeric material with a matted (i.e. dull finish) ink, by lacquering at least one surface of the sheet of polymeric material with a dull finish lacquer or a matting lacquer, by embossing the sheet of polymeric material to provide an embossed pattern simulating the texture and appearance of paper, or by flocking the sheet of polymeric material, or by application of a foamable lacquer or foamable ink to the sheet of polymeric material, or by embossing and printing the sheet of polymeric material to provide embossed and printed patterns wherein the embossed and printed patterns may be in registry, out of registry or wherein a portion of the embossed and printed patterns are in registry and a portion of the embossed and printed patterns are out of registry. In addition, a matt or textured finish capable of providing the sheet of polymeric material with a texture and appearance assimilating the texture and appearance of paper can be achieved by extruding a polymeric resin onto a matted or textured chill roll. Thereafter, the web of material having a texture and appearance assimilating the texture and appearance of paper can be cut in a conventional manner to provide the polymeric ribbon material 210 having a texture and appearance assimilating the texture and appearance of paper.

Any polymeric material capable of being textured or otherwise modified to provide the polymeric material with a texture and appearance assimilating the texture and appearance of paper can be employed in the formulation of the polymeric ribbon material 210. For example, the polymeric material employed to produce the polymeric ribbon material 210 can be polypropylene film having a thickness of from about 0.1 mil to about 30 mils, and more desirably of from about 0.5 mils to about 10 mils, or an expanded core polymeric film having a thickness of from about 0.5 to about 10 mils.

Referring now to FIG. 20B, designated generally by the reference numeral 220 is another embodiment of a polymeric ribbon material for forming decorative bows and for wrapping items. The polymeric ribbon material 220 is a laminated material comprising a first web or sheet of material 222 having a thickness of from about 0.5 to about 10 mils, and more desirably from about 0.6 mil to about 1.25 mils, and a second web or sheet of material 224 having a thickness of from about 0.5 to about 10 mils, and more desirably from about 0.6 mil to about 1.25 mils. The laminated material having a texture and appearance assimilating the texture and appearance of paper can be produced by laminating two or more sheets of polymeric film (such as two or more sheets of polypropylene film or a sheet of polypropylene film and a sheet of expanded core polymeric film, such as expanded core polypropylene film), or by laminating a polymeric film (such as polypropylene film or an expanded core polymeric film) with a sheet of metallized foil and the like wherein at least one surface of the laminated material is textured or modified to assimilate the texture and appearance of paper. The second web or sheet of material 224 is desirably laminated to the first web or sheet of material 222 with a colored adhesive so as to impart a desired color to the polymeric ribbon material 220. If desired the polymeric ribbon material 220 may be treated or otherwise processed to provide the polymeric ribbon material 220 with a matt or textured finish assimilating paper in appearance so that the polymeric ribbon material has a paper-like appearance similar to the polymeric ribbon material 210 hereinbefore described with reference to FIG. 20A. That is, a matt or textured finish assimilating paper in texture and appearance can be printed on the first web or sheet of material 222 and thereafter the second web or sheet of material 224 (which in this case is desirably a matt material of translucent polymeric film) is laminated to the first web or sheet of material 222 to provide the polymeric ribbon material with a texture and appearance assimilating the texture and appearance of paper. To further enhance the texture and appearance assimilating the texture and appearance of paper of the polymeric ribbon material 220, the second web or sheet of material 224 may or may not have a plurality of spatially disposed holes extending therethrough. The matt or textured finish 212 can be produced by printing at least one of the first and second webs or sheets of material 222 and 224 with a matted (i.e. dull finish) ink, by lacquering at least one surface of at least one of the first and second webs or sheets of material 222 and 224 with a dull finish lacquer or a matting lacquer, by flocking at least one of the first and second webs or sheets of material 222 and 224, by application of a foamable lacquer or foamable ink to at least one of the first and second webs or sheets of material 222 and 224, by embossing at least one of the first and second webs or sheets of material 222 and 224 to provide an embossed pattern assimilating the appearance and texture of paper, or by embossing and printing at least one of the first and second webs or sheets of material 222 and 224 to provide embossed and printed patterns wherein the embossed and printed patterns may be in registry, out of registry or wherein a portion of the embossed and printed patterns are in registry and a portion of the embossed and printed patterns are out of registry. In addition, a matt or textured finish capable a providing the polymeric ribbon material with a texture and appearance assimilating the texture and appearance of paper can be achieved by extruding the resin used to produce one of the first and second webs or sheets of material 222 and 224 onto a matted or textured chill roll.

Referring now to FIG. 20C, designated generally by the reference numeral 230 is another embodiment of a polymeric ribbon material for forming decorative bows and for wrapping items. The polymeric ribbon material 230 comprises a polymeric film 232 having an upper surface 234, a lower surface 236. An acrylic heat sealable lacquer 238 can applied to at least one of the upper and lower surfaces of the polymeric film 232, such as the lower surface 236 of the polymeric film 232 and the upper surface 234 of the polymeric film 232 is desirably modified to provide the polymeric ribbon material with a matt or textured finish assimilating the texture and appearance of paper. The modification of the polymeric film 232 to provide the polymeric ribbon material 230 with a texture and appearance assimilating the texture and appearance of paper can be accomplished in several ways. For example, the polymeric ribbon material 230 having the matt or textured finish can be produced by printing a web of polymeric material with a matted (i.e. dull finish) ink, by lacquering at least one surface of the sheet of polymeric material with a dull finish lacquer or a matting lacquer, by flocking the sheet of polymeric material, by application of a foamable lacquer or foamable ink to the sheet of polymeric material, by embossing the sheet of polymeric material to provide an embossed pattern assimilating the texture and appearance of paper, or by embossing and printing the sheet of polymeric material to provide embossed and printed patterns wherein the embossed and printed patterns may be in registry, out of registry or wherein a portion of the embossed and printed patterns are in registry and a portion of the embossed and printed patterns are out of registry. In addition, a matt or textured finish capable of providing the sheet of polymeric material with a texture and appearance assimilating the texture and appearance of paper can be achieved by extruding a polymeric resin onto a matted or textured chill roll. Thereafter, the web of material having a texture and appearance assimilating the texture and appearance of paper can be cut in a conventional manner to provide the polymeric film 232.

Any polymeric film capable of being textured or otherwise modified to provide the polymeric material with a texture and appearance assimilating the texture and appearance of paper can be employed in the formulation of the polymeric ribbon material 230. For example, the polymeric film 232 employed to produce the polymeric ribbon material 210 can be polypropylene film having a thickness of from about 0.1 mil to about 30 mils, and more desirably of from about 0.5 mils to about 10 mils, or an expanded core polymeric film having a thickness of from about 0.6 to about 10 mils.

Changes may be made in the construction and the operation of the various components, elements and assemblies described herein or in the steps or the sequence of steps of the methods described herein without departing from the spirit and scope of the invention as defined in the following claims.

What is claimed is:

1. A method for wrapping a floral grouping, comprising the steps of:

providing a floral grouping having a bloom portion and a stem portion;

providing a sleeve formed of a flexible, laminated polymeric material, the flexible, laminated polymeric material having at least a portion of one surface thereof printed to provide a texture or appearance simulating the texture or appearance of paper so that at least a portion of the sleeve formed of the flexible, laminated polymeric material is provided with a texture or appearance simulating the texture or appearance of paper, the sleeve having an upper end, a lower end, an inner peripheral surface surrounding an inner retaining space, and an outer peripheral surface;

placing the floral grouping into the inner retaining space of the sleeve; and binding the sleeve about the floral grouping by tightening a portion of the sleeve about a portion of the stem portion of the floral grouping for holding the sleeve about the floral grouping.

2. The method of claim 1 wherein, in the step of providing a sleeve, the flexible, laminated polymeric material has a thickness in the range of from about 1 mil to about 20 mil.

3. The method of claim 1 wherein, in the step of providing a sleeve, the flexible, laminated polymeric material is formed by laminating at least two sheets of material and wherein each sheet of material has a thickness in the range of from about 0.5 mil to about 10 mil.

4. The method of claim 3 wherein, in the step of providing a sleeve, the sheets of material of the flexible, laminated polymeric material are laminated with a colored adhesive.

5. The method of claim 4 wherein, in the step of providing a sleeve, each sheet of material forming the flexible, laminated polymeric material has a thickness in the range of from about 0.6 mil to about 1.25 mil, and the flexible, laminated polymeric material has a thickness in the range of from about 1.2 mil to about 2.5 mil.

6. The method of claim 1 wherein, in the step of providing a sleeve, the sleeve is provided with a bonding material disposed upon a portion of the outer peripheral surface of the sleeve.

7. The method of claim 1 wherein, in the step of providing a sleeve, the sleeve is provided with a bonding material disposed upon a portion of the inner peripheral surface of the sleeve.

8. The method of claim 1 wherein, in the step of providing a sleeve, the sleeve is provided with a bonding material disposed upon portions of both the inner peripheral surface and the outer peripheral surface of the sleeve.

9. The method of claim 1 wherein, in the step of providing a sleeve, the flexible, laminated polymeric material is further provided with a printed pattern disposed on at least a portion of one surface thereof.

10. The method of claim 9 wherein, in the step of providing a sleeve, the flexible, laminated polymeric material is further provided with an embossed pattern disposed on at least a portion of one surface thereof.

11. The method of claim 10 wherein, in the step of providing a sleeve, at least a portion of the printed pattern and the embossed pattern are in registry with one another.

12. The method of claim 10 wherein, in the step of providing a sleeve, at least a portion of the printed pattern and the embossed pattern are out of registry with one another.

13. The method of claim 1 wherein, in the step of providing a sleeve, the flexible, laminated polymeric material is further provided with an embossed pattern disposed on at least a portion of one surface thereof.

14. A method for packaging a plant comprising the steps of:

providing a flower pot containing a floral grouping;

providing a flexible polymeric sleeve formed of an expanded core polymeric film wherein at least a portion of one surface of the expanded core polymeric film is printed so that at least a portion of the flexible polymeric sleeve is provided with an appearance or texture simulating the appearance or texture of paper, the flexible polymeric sleeve having an upper end, a lower end, an outer peripheral surface, an inner peripheral surface, an inner retaining space and perforations at preselected areas, the flexible polymeric sleeve having an upper portion and a lower portion wherein the upper portion of the flexible polymeric sleeve is removable from the lower portion of the flexible polymeric sleeve along the perforations; and disposing the flower pot within the flexible polymeric sleeve such that the lower portion of the flexible polymeric sleeve is positioned adjacent the flower pot and the upper portion of the flexible polymeric sleeve extends upwardly from the flower pot and substantially surrounds and encompasses the floral grouping within the flower pot so that when the upper portion of the flexible polymeric sleeve is detached from the lower portion of the flexible polymeric sleeve along the perforations, the lower portion of the flexible polymeric sleeve remains disposed about the flower pot and forms a decorative plant cover having an appearance or texture simulating the appearance or texture of paper which substantially surrounds and encompasses the flower pot.

15. The method of claim 14 wherein, in the step of providing a flexible polymeric sleeve, the lower end of flexible polymeric the sleeve is closed.

16. The method of claim 14 wherein, in the step of providing a flexible polymeric sleeve, the perforations in the flexible polymeric sleeve include vertical perforations and circumferential perforations.

17. The method of claim 14 wherein, in the step of providing a flexible polymeric sleeve, the expanded core polymeric film from which the flexible polymeric sleeve is formed has a thickness of from about 0.1 mil to about 30 mil.

18. The method of claim 17 wherein, in the step of providing a flexible polymeric sleeve, the expanded core polymeric film from which the flexible polymeric sleeve is formed further comprises two or more layers of material wherein at least one of the layers of material is printed to provide such layer of material with the texture or appearance simulating the texture or appearance of paper.

19. The method of claim 14 wherein, in the step of providing a flexible polymeric sleeve, the flexible polymeric sleeve is further provided with a printed pattern disposed on at least a portion of one surface thereof.

20. The method of claim 19 wherein, in the step of providing a flexible polymeric sleeve having an appearance assimilating paper and perforations at preselected areas, the flexible polymeric sleeve is further provided with an embossed pattern thereon.

21. The method of claim 20 wherein, in the step of providing a flexible polymeric sleeve having an appearance assimilating the appearance of paper and perforations at preselected areas, at least a portion of the printed material, designs and combinations thereof and the embossed pattern on the flexible polymeric sleeve are in registry.

22. The method of claim 20 wherein, in the step of providing a flexible polymeric sleeve having an appearance assimilating the appearance of paper and perforations at preselected areas, at least a portion of the printed material, designs and combinations thereof and the embossed pattern are out of register with one another.

23. The method of claim 14 wherein, in the step of providing a flexible polymeric sleeve, the flexible polymeric sleeve is further provided with an embossed pattern disposed on at least a portion of one surface thereof.

24. The method of claim 14 comprising the additional step of removing the upper portion of the flexible polymeric sleeve by tearing the upper portion away from the lower portion of the flexible polymeric sleeve along the perforations.

25. The method of claim 14 wherein, in the step of providing a flexible polymeric sleeve, at least a portion of one surface of the lower portion of the flexible polymeric sleeve is provided with the appearance or texture simulating the appearance or texture of paper.

26. The method of claim 14 wherein, in the step of providing a flexible polymeric sleeve, at least a portion of one surface of the upper portion of the flexible polymeric sleeve is provided with the appearance or texture simulating the appearance or texture of paper.

27. The method of claim 14 wherein, in the step of providing a flexible sleeve, at least a portion of one surface of the upper and lower portions of the flexible polymeric sleeve are provided with the appearance or texture simulating the appearance or texture of paper.

28. A method for providing a decorative polymeric cover for a flower pot wherein at least a portion of one surface of the decorative polymeric cover is provided with a texture or appearance simulating the texture or appearance of paper, the method comprising the steps of:

providing a sleeve formed of an expanded core polymeric film, the sleeve having at least a portion of one surface thereof printed to provide a texture or appearance simulating the texture or appearance of paper, the sleeve having an upper end, a lower end, an outer peripheral surface, an inner peripheral surface and an inner retaining space;

providing a flower pot; and disposing the flower pot through the upper end of the sleeve and into the inner retaining space of the sleeve whereby the sleeve encompasses a substantial portion of the flower pot and provides the decorative polymeric cover for the flower pot which is provided with the appearance or texture simulating the appearance or texture of paper.

29. A method for packaging a plant comprising the steps of:

providing a flower pot containing a floral grouping;

providing a flexible polymeric sleeve having at least a portion of one surface thereof printed to provide an appearance or texture simulating the appearance or texture of paper, the flexible polymeric sleeve having an upper end, a lower end, an outer peripheral surface, an inner peripheral surface, an inner retaining space and perforations at preselected areas, the flexible polymeric sleeve having an upper portion and a lower portion wherein the upper portion of the flexible polymeric sleeve is removable from the lower portion of the flexible polymeric sleeve along the perforations; and disposing the flower pot within the flexible polymeric sleeve such that the lower portion of the flexible polymeric sleeve is positioned adjacent the flower pot and the upper portion of the flexible polymeric sleeve extends upwardly from the flower pot and substantially surrounds and encompasses the floral grouping within the flower pot so that when the upper portion of the flexible polymeric sleeve is detached from the lower portion of the flexible polymeric sleeve along the perforations, the lower portion of the flexible polymeric sleeve remains disposed about the flower pot and forms a decorative plant cover having an appearance or texture simulating the appearance or texture of paper which substantially surrounds and encompasses the flower pot.

30. The method of claim 29 wherein, in the step of providing a flexible polymeric sleeve, the lower end of the flexible polymeric sleeve is closed.

31. The method of claim 29 wherein, in the step of providing a flexible polymeric sleeve, the perforations in the flexible polymeric sleeve include vertical perforations and circumferential perforations.

32. The method of claim 29 wherein, in the step of providing a flexible polymeric sleeve, the flexible polymeric sleeve is constructed of a polymeric material having a thickness of from about 0.1 mil to about 30 mil.

33. The method of claim 29 wherein, in the step of providing a flexible polymeric sleeve, the flexible polymeric sleeve is further defined as being constructed of two or more layers of material wherein at least one of the layers of material is printed to provide the texture or appearance simulating the texture or appearance of paper.

34. The method of claim 29 wherein, in the step of providing a flexible polymeric sleeve, the flexible polymeric sleeve is further provided with a printed pattern disposed on at least a portion of one surface thereof.

35. The method of claim 34 wherein, in the step of providing a flexible polymeric sleeve, the flexible polymeric sleeve is further provided with an embossed pattern disposed on at least a portion of one surface thereof.

36. The method of claim 35 wherein at least a portion of the printed pattern and the embossed pattern on the flexible polymeric sleeve are in registry.

37. The method of claim 35 wherein at least a portion of the printed pattern and the embossed pattern are out of register with one another.

38. The method of claim 29 wherein, in the step of providing a flexible polymeric sleeve, the flexible polymeric sleeve is further provided with an embossed pattern disposed on at least a portion of one surface thereof.

39. The method of claim 29 comprising the additional step of removing the upper portion of the flexible polymeric sleeve by tearing the upper portion away from the lower portion along the perforations.

40. The method of claim 29 wherein, in the step of providing a flexible polymeric sleeve, at least a portion of one surface of the lower portion of the flexible polymeric sleeve is provided with the appearance or texture simulating the appearance or texture of paper.

41. The method of claim 29 wherein, in the step of providing a flexible polymeric sleeve, at least a portion of one surface of the upper portion of the flexible polymeric sleeve is provided with the appearance or texture simulating the appearance or texture of paper.

42. The method of claim 29 wherein, in the step of providing a flexible polymeric sleeve, at least a portion of one surface of the upper and lower portions of the flexible polymeric sleeve are provided with the appearance or texture simulating the appearance or texture of paper.

43. The method of claim 1 wherein, in the step of providing a sleeve, the flexible, laminated polymeric material is printed with a matted ink to provide the texture or appearance simulating the texture or appearance of paper.

44. The method of claim 1 wherein, in the step of providing a sleeve, at least a portion of the flexible, laminated polymeric material is further provided with embossing which cooperates with the printing to provide the texture or appearance simulating the texture or appearance of paper.

45. The method of claim 44 wherein the printing and embossing are in register with one another.

46. The method of claim 44 wherein at least a portion of the printing and embossing are out of register with one another.

47. The method of claim 29 wherein, in the step of providing a flexible polymeric sleeve, the flexible polymeric sleeve is printed with a matted ink to provide the appearance or texture simulating the appearance or texture of paper.

48. The method of claim 29 wherein, in the step of providing a flexible polymeric sleeve, the flexible polymeric sleeve is further provided with embossing on at least a portion of one surface thereof which cooperates with the printing to provide the appearance or texture simulating the appearance or texture of paper.

49. The method of claim 48 wherein the printing and embossing are in register with one another.

50. The method of claim 48 wherein at least a portion of the printing and embossing are out of register with one another.

51. A method for wrapping a floral grouping, comprising the steps of:

providing a floral grouping having a bloom portion and a stem portion;

providing a sleeve formed of a flexible, laminated polymeric material, the flexible, laminated polymeric material having at least a portion of one surface thereof embossed to provide a texture or appearance simulating the texture or appearance of paper so that at least a portion of the sleeve formed of the flexible, laminated polymeric material is provided with a texture or appearance simulating the texture or appearance of paper, the sleeve having an upper end, a lower end, an inner peripheral surface surrounding an inner retaining space, and an outer peripheral surface;

placing the floral grouping into the inner retaining space of the sleeve; and binding the sleeve about the floral grouping by tightening a portion of the sleeve about a portion of the stem portion of the floral grouping for holding the sleeve about the floral grouping.

52. The method of claim 51 wherein, in the step of providing a sleeve, the flexible, laminated polymeric material is formed by laminating at least two sheets of material and wherein each sheet of material has a thickness in the range of from about 0.5 mil to about 10 mil.

53. The method of claim 51 wherein, in the step of providing a sleeve, the sleeve is provided with a bonding material disposed upon a portion of the outer peripheral surface of the sleeve.

54. The method of claim 51 wherein, in the step of providing a sleeve, the sleeve is provided with a bonding material disposed upon a portion of the inner peripheral surface of the sleeve.

55. The method of claim 51 wherein, in the step of providing a sleeve, the sleeve is provided with a bonding material disposed upon portions of both the inner peripheral surface and the outer peripheral surface of the sleeve.

56. The method of claim 51 wherein, in the step of providing a sleeve, the flexible, laminated polymeric material is further provided with a printed pattern disposed on at least a portion of one surface thereof.

57. The method of claim 56 wherein, in the step of providing a sleeve, the flexible, laminated polymeric material is further provided with an embossed pattern disposed on at least a portion of one surface thereof.

58. The method of claim 57 wherein, in the step of providing a sleeve, at least a portion of the printed pattern and the embossed pattern are in registry with one another.

59. The method of claim 57 wherein, in the step of providing a sleeve, at least a portion of the printed pattern and the embossed pattern are out of registry with one another.

60. The method of claim 51 wherein, in the step of providing a sleeve, the flexible, laminated polymeric material is further provided with an embossed pattern disposed on at least a portion of one surface thereof.

61. A method for packaging a plant comprising the steps of:

providing a flower pot containing a floral grouping;

providing a flexible polymeric sleeve having at least a portion of one surface thereof embossed to provide an appearance or texture simulating the appearance or texture of paper, the flexible polymeric sleeve having an upper end, a lower end, an outer peripheral surface, an inner peripheral surface, an inner retaining space and perforations at preselected areas, the flexible polymeric sleeve having an upper portion and a lower portion wherein the upper portion of the flexible polymeric sleeve is removable from the lower portion of the flexible polymeric sleeve along the perforations; and disposing the flower pot within the flexible polymeric sleeve such that the lower portion of the flexible polymeric sleeve is positioned adjacent the flower pot and the upper portion of the flexible polymeric sleeve extends upwardly from the flower pot and substantially surrounds and encompasses the floral grouping within the flower pot so that when the upper portion of the flexible polymeric sleeve is detached from the lower portion of the flexible polymeric sleeve along the perforations, the lower portion of the flexible polymeric sleeve remains disposed about the flower pot and forms a decorative plant cover having an appearance or texture simulating the appearance or texture of paper which substantially surrounds and encompasses the flower pot.

62. The method of claim 61 wherein, in the step of providing a flexible polymeric sleeve, the flexible polymeric sleeve is constructed of a polymeric material having a thickness of from about 0.1 mil to about 30 mil.

63. The method of claim 61 wherein, in the step of providing a flexible polymeric sleeve, the flexible polymeric sleeve is further defined as being constructed of two or more layers of material wherein at least one of the layers of material is embossed to provide the texture or appearance simulating the texture or appearance of paper.

64. The method of claim 61 wherein, in the step of providing a flexible polymeric sleeve, the flexible polymeric sleeve is further provided with a printed pattern disposed on at least a portion of one surface thereof.

65. The method of claim 64 wherein, in the step of providing a flexible polymeric sleeve, the flexible polymeric sleeve is further provided with an embossed pattern disposed on at least a portion of one surface thereof.

66. The method of claim 65 wherein at least a portion of the printed pattern and the embossed pattern on the flexible polymeric sleeve are in registry.

67. The method of claim 65 wherein at least a portion of the printed pattern and the embossed pattern are out of register with one another.

68. The method of claim 61 wherein, in the step of providing a flexible polymeric sleeve, the flexible polymeric sleeve is further provided with an embossed pattern disposed on at least a portion of one surface thereof.

69. The method of claim 61 comprising the additional step of removing the upper portion of the flexible polymeric sleeve by tearing the upper portion away from the lower portion of the flexible polymeric sleeve along the perforations.

70. The method of claim 61 wherein, in the step of providing a flexible polymeric sleeve, at least a portion of one surface of the lower portion of the flexible polymeric sleeve is provided with the appearance or texture simulating the appearance or texture of paper.

71. The method of claim 61 wherein, in the step of providing a flexible polymeric sleeve, at least a portion of one surface of the upper portion of the flexible polymeric sleeve is provided with the appearance or texture simulating the appearance or texture of paper.

72. The method of claim 61 wherein, in the step of providing a flexible sleeve, at least a portion of one surface of the upper and lower portions of the flexible polymeric sleeve are provided with the appearance or texture simulating the appearance or texture of paper.

* * * * *

UNITED STATES PATENT AND TRADEMARK OFFICE
CERTIFICATE OF CORRECTION

PATENT NO.    : 6,425,224 B1                                    Page 1 of 1
DATED         : July 30, 2002
INVENTOR(S)   : Donald E. Weder It is certified that error appears in the above-identified patent and that said Letters Patent is hereby corrected as shown below:

Column 22,
Lines 23-39, delete Claims 20, 21 and 22 in their entirety and replace with the following:

20. The method of claim 19 wherein, in the step of providing a flexible polymeric sleeve, the flexible sleeve is further provided with an embossed pattern disposed on at least a portion of one surface thereof.

21. The method of claim 20 wherein at least a portion of the printed pattern and the embossed pattern on the flexible polymeric sleeve are in registry.

22. The method of claim 20 wherein at least a portion of the printed pattern and the embossed pattern are out of register with one another.

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,425,224 B1
DATED : July 30, 2002
INVENTOR(S) : Donald E. Weder

It is certified that error appears in the above-identified patent and that said Letters Patent is hereby corrected as shown below:

Drawings,
FIG. 1, change number "24" to number -- 26 --; and change number "26" to number -- 24 --.
FIGS. 4 and 8, delete number "28" and line with the arrow to number -- 28 --.
FIG. 5, delete number "28" and line with the arrow to number -- 28 --; add number -- 38 -- with a line to the top of FIG. 5; and add number -- 40 -- with a line to the bottom of FIG. 5.
FIG. 6, delete number "28" and line with the arrow to number -- 28 --; change number "22" to number -- 20 --; change number "20" to number -- 22 --; add number -- 10 -- with line with arrow to right side of FIG.; add number -- 27 -- with dotted line pointing to center of FIG. to right side of FIG.; and change number "24" to number -- 26 --.
FIG. 7, delete number "28" and line with the arrow to number -- 28 --; change number "12" to number -- 10 --.
FIG. 10, add number -- 133 -- with line to center of FIG.
FIG. 11, add number -- 133 -- with line to center of pot.
FIG. 18, add number -- 188 -- with line with arrow to left side of FIG.; add number -- 190 -- with line with arrow to bottom of FIG.; add number with dotted line to bottom of FIG.; change number "176b" to number -- 187 --; add number -- 201 -- with dotted line to right side of FIG.
FIG. 19, change number "124" to number -- 164b --; change number "176b" to number -- 187 --; add number -- 203 -- with line to center of pot to FIG.
FIG. 20B, add number -- 226 -- with line to left end of FIG.
FIG. 20C, add number -- 240 -- with line to left end of FIG.; add number -- 234 -- to right end of FIG.

Column 1,
Line 20, delete word "assimilating" and replace with -- simulating the texture and appearance of --
Line 23, after word "wrappings" and before word "ribbon" add word -- and --; and after word "materials" delete words "and decorative grasses".
Line 30, after word "pots" delete the remainder of the paragraph.
Line 54, before word "material" add word -- polymeric --.
Line 56, delete word "a" and replace with word -- the --.
Line 62, delete word "a" and replace with word -- the --; delete word "the" before word "polymeric".
Line 65, delete word "a" and replace with word -- the --; delete word "the" at end of sentence.

Column 2,
Line 25, delete word "a" and replace with word -- the --; delete word "the" before word "polymeric".

UNITED STATES PATENT AND TRADEMARK OFFICE
CERTIFICATE OF CORRECTION

PATENT NO.      : 6,425,224 B1
DATED           : July 30, 2002
INVENTOR(S)     : Donald E. Weder It is certified that error appears in the above-identified patent and that said Letters Patent is hereby corrected as shown below:

Column 3,
Lines 1, 6, 12, 13 and 25, change word "matt" to -- matte --.
Line 2, add the following to end of paragraph -- The term "texture and appearance assimilating paper" may be used interchangeably herein with the terms "matte or textured finish assimilating the texture and appearance of paper" and "texture and appearance simulating the texture and appearance of paper --.
Line 4, after word "material" and before word "with" add the number -- 10 --; and change word "matt" to -- matte --.
Line 8, after word "material" and before word "and" add number -- 10 --; and change word "matt" to -- matte --.
Line 9, after word "film" and before word "over" add a -- comma --.
Lines 15, 17, 26, 31 and 39, add number -- 10 -- after word "material" and before word "with".
Line 18, add number -- 10 -- after word "material" and before word "to".
Line 19, delete word "cloth" after word "of" and replace with word -- paper --.
Line 23, after word "registry" and before word "or" add a -- comma --.
Line 30, add number -- 10 -- after word "material" at end of sentence; and change word "matt" to -- matte --.
Line 44, after word "surfaces" and before word "of" add numbers -- 14 and 16 --; and after word "of" and before word "material" add word -- polymeric --.
Line 45, after word "shown" and before word "and" add words -- in FIG. 2 --.
Line 50, after number "3" and before number "6" change word "and" to word -- through --.
Line 54, delete number "14" and word "and" change to -- 13 through --; delete number "18" and change to -- 17 --.
Line 55, delete word "and" before number "19" and change to -- through --; add the word -- or -- before the words "to provide"; delete the words "having a" after the word "material"; delete "(FIG. 20A)" and replace with -- (FIG. 20A through 20C) --.
Line 56, delete "; or to produce decorative grass (FIGS. 21 and 22A)".
Line 67, delete "or to produce decorative" at end of line.

Column 4,
Line 1, delete "grasses having a texture and appearance assimilating the".
Line 2, delete "texture and appearance of paper".
Line 13, delete the words " and" "or" at end of sentence and replace with -- and/or --.
Line 21, add word -- polymeric -- after word "of" at end of sentence.

UNITED STATES PATENT AND TRADEMARK OFFICE
CERTIFICATE OF CORRECTION

PATENT NO. : 6,425,224 B1
DATED : July 30, 2002
INVENTOR(S) : Donald E. Weder

It is certified that error appears in the above-identified patent and that said Letters Patent is hereby corrected as shown below:

Column 5,
Lines 19, 22 and 46, add word -- polymeric -- after word "of" and before word "material".
Line 25, delete word "group" after word "floral" and change to -- grouping --.
Line 28, delete words "or decorative grass" after word "ribbon" and replace with word -- material --.
Line 30, delete word "mils" after number "30" and replace with word -- mil --.
Line 31, delete words "mils" after numbers "0.5" and "10" and replace with word -- mil --.
Line 34, add the words -- or polyethylene -- after the word "polypropylene".
Line 66, delete the words "mils" after numbers "0.1" and "10" and replace with word -- mil --.
Line 67, delete the words "mils" after numbers "0.5" and "2.5" and replace with word -- mil --.

Column 6,
Line 6, delete word "and" after number "3" and before number "6" and replace with word -- through --.
Line 10, delete number "14" and word "and" and replace with -- 13 through --; and delete number "18" and word "and" and replace with -- 17 through --.
Line 11, delete "(FIG. 20A)" and replace with -- (FIGS. 20A through 20C) --; and delete phrase "or decorative grass" at end of line.
Line 12, delete "(FIGS. 21 and 22A)".
Line 14, delete "(FIG. 9B)" and replace with the following -- (as shown in FIG. 913 and described in more detail hereinafter) --.
Lines 31 and 42, after the word "material" delete the phrase "or decorative grass".
Line 36, after the word "be" change word "sufficient" to -- sufficiently --.

Column 7,
Line 10, after word "issued" add the phrase -- to Weder et al. on --.
Line 36, after word "the" and before word "strip" delete word "bonding"; and after word "strip" add phrase -- of bonding material 27 --.
Line 44, beginning with word "Referring" this should start a new paragraph.
Line 46, after word "of" and before word "material" add word -- polymeric --.
Line 58, after word "near" and before word "second" add word -- the --.
Line 62, after number "27" add phrase -- on the upper surface 14 --.
Line 63, before word "sheet" add phrase -- lower surface 16 of the --.

UNITED STATES PATENT AND TRADEMARK OFFICE
CERTIFICATE OF CORRECTION

PATENT NO.  : 6,425,224 B1
DATED       : July 30, 2002
INVENTOR(S) : Donald E. Weder It is certified that error appears in the above-identified patent and that said Letters Patent is hereby corrected as shown below:

Column 8,
Line 4, delete word "end" and replace with word -- portion --.
Line 6, delete word "end" and replace with word -- portion --; and after number "44" and before word "exposed" add phrase -- of the floral grouping 34 is --.
Line 7, delete hyphen between the word "lower-end"; and after word "end" and before word "of" add number -- 40 --.
Line 13, after word "to" and before word "side" add words -- the fourth --; and change number "24" to number -- 26 --.
Line 16, change word "third" to word -- fourth --; and change number "24" to number -- 26 --.
Line 17, change word "fourth" to word -- third --.
Line 18, change number "26" to number -- 24 --.
Line 23, after word "of" and before word "material" add word -- polymeric --; both occurrences.
Line 24, change word "third" to -- fourth --.
Line 25, after word "of" and before word "material" add word -- polymeric --.
Line 37, after number "56," and before word "an" add word -- and --.
Line 55, after word "bonding" and before word "or" change word "means" to word -- material --.
Line 60, after word "applicator" and before number "66" change word "apparatus" to word -- device --.

Column 9,
Line 1, after the word "as" and before the word "elastic" add the word -- the --.
Line 11, after the word "direction" and before the number "78" add the following -- indicated by an arrow --.
Line 15, after number "50" add a -- comma --.
Line 22, after the word "direction" and before the number "80" add the following -- indicated by the arrow --.
Line 25, after partial word "cally" and before word "such" add a -- comma --.
Line 26, after number "599" add phrase -- , issued to Weder et al. on April 21, 1992, --; and after word "hereby" and before word "incorporated" add word -- expressly --.
Line 27, after word "as" at end of line add word -- is --.
Line 29, after number "5,609,009," add phrase -- issued to Weder et al. on March 11, 1997, --.
Line 30, after word "hereby" and before word "incorporated" add word -- expressly --.
Line 33, after word "the" and before word "pot" add word -- flower --; and change number "60" to number -- 50 --.
Line 35, after word "hereby" and before word "incorporated" add word -- expressly --.

UNITED STATES PATENT AND TRADEMARK OFFICE
CERTIFICATE OF CORRECTION

PATENT NO. : 6,425,224 B1
DATED : July 30, 2002
INVENTOR(S) : Donald E. Weder

It is certified that error appears in the above-identified patent and that said Letters Patent is hereby corrected as shown below:

Column 9 (cont'd),
Line 37, after word "the" and before word "band" add word -- elastic --.
Line 44, after word "as" and before word "bonding" add the word -- the --.
Line 50, after word "material" add number -- 27 --.
Lines 51 and 53, after word "material" and before word "may" add number -- 27 --.
Line 52, after number "10" add a -- comma --.
Line 54, after words "bonding material" add number -- 27 --.
Line 58, after word "material" and before word "on" add number -- 27 --.
Line 64, delete "comma" between words "combination" and "having".

Column 10,
Line 1, before the word "floral" change the word "a" to word -- the --; after word "grouping" add number -- 34 --; before word "flower" change the word "a" to word -- the --; after word "pot" add number -- 50 --.
Line 2, after word "material" and before word "may" add number -- 27 --.
Line 5, after word "material" and before word "is" add number -- 27 --.
Line 27, after the word "bonding" change the word "material" to -- materials --.
Line 31, delete the words "wrapping and/or sleeve" and add the following -- sheet of polymeric material 10 about the floral grouping 34 or the flower pot 50 --.
Line 36, after words "bonding material" add the number -- 27 --.
Lines 52, 53 and 54, change the word "means" to the word -- material --.

Column 11,
Line 5, after the word "paper" and before the "comma" add the following -- (FIG. 1) --.
Line 6, before word "flexible" add the words -- sheet of --; and after word "flexible" and before word "material" add word -- polymeric --.
Lines 11, 22, 25 and 64, after word "flexible" and before word "material" add word -- polymeric --.
Line 13, after word "the" and before word "preformed" add word -- decorative --.
Line 16, after number "0.5" add word -- mil --; and after number "10" change word "mils" to word -- mil --.
Line 17, after number "0.6" add word -- mil --.
Line 18, change word "mils" to word -- mil --.
Line 23, before words "expanded core" add words -- sheet of --.
Line 27, after word "the" and before word "polymeric" add words -- sheet of --; and after word "the" and before word "laminated" add words -- sheet of flexible --.
Line 33, after the word "the" and before the partial word "poly-" add the words -- sheet of --.
Line 34, after the word "the" and before the word "laminated" add the words -- sheet of flexible --.

UNITED STATES PATENT AND TRADEMARK OFFICE
CERTIFICATE OF CORRECTION

PATENT NO. : 6,425,224 B1
DATED : July 30, 2002
INVENTOR(S) : Donald E. Weder

It is certified that error appears in the above-identified patent and that said Letters Patent is hereby corrected as shown below:

Column 11 (cont'd),
Line 35, after the word "the" and before the word "expanded" add the words -- sheet of --.
Lines 36, 38, 43, 44 and 56, change the word "matt" to -- matte --.
Line 54, after the word "registry" and before the word "or" add a -- comma --.
Line 57, delete the word "a" after the word "capable" and replace with the -- of --.
Line 67, before the words "material 112" add the word -- polymeric --.

Column 12,
Line 4, after the word "flexible" add the word -- polymeric --.
Line 7, after the number "112" and before the word "is" add a -- comma --; and after the word "the" and before the partial word "pre-" add the word -- decorative --.
Line 9, after the word "formed" and before the word "and" add a -- comma --.
Line 10, after the word "the" and before the word "preformed" add the word -- decorative --.
Line 14, change number "122" to number -- 110 --.
Line 17, after word "space" and before word "within" add the number -- 133 --.
Lines 20, 22 and 49, after word "flexible" and before word "material" add word -- polymeric --.
Line 21, after the word "the" and before the word "preformed" add the word -- decorative --.
Line 24, after number "116a" delete "comma" and add the word -- and --; after the number "118a" add a -- comma --.
Lines 27, 50 and 54, after word "flexible" and before word "material" add words -- laminated polymeric --.
Line 29, after the word "The" and before the word "laminated" add the words -- sheet of flexible --; and after the word "laminated" and before the word "material" add the word -- polymeric --.
Line 30, before the word "having" add the number -- 112a --.
Line 39, after the word "the" and before the word "laminated" add the words -- sheet of flexible --; and after the word "laminated"; before the word "material" add the word -- polymeric --; and after the word "material" and before the word "is" add the number -- 112a --.
Lines 42 and 45, after number "10" change word "mils" to -- mil --.
Line 43, after number "1.25" change word "mils" to -- mil --.
Lines 44 and 53, change number "120" to number -- 120a --.
Line 46, after word "sheet" and before word "material" change word "or" to word -- of --; and change number "120" to number -- 120a --.
Line 55, after number "20" change word "mils" to word -- mil --.
Line 56, after numbers "1.2" and "2.5" change word "mils" to word -- mil --.

UNITED STATES PATENT AND TRADEMARK OFFICE
CERTIFICATE OF CORRECTION

PATENT NO. : 6,425,224 B1
DATED : July 30, 2002
INVENTOR(S) : Donald E. Weder

It is certified that error appears in the above-identified patent and that said Letters Patent is hereby corrected as shown below:

Column 12 (cont'd),
Line 57, after word "the" and before word "preformed" add word -- decorative --.
Line 60, delete word "the" before word "flexible" and after word "flexible" add word -- polymeric --.
Line 61, delete word "the" at end of line.
Line 62, after word "flexible" and before word "material" add word -- polymeric --; and after word "The" and before word "preformed" add word -- decorative --.
Line 64, after word "folds" and before word "formed" add number -- 122 --.
Line 65, after word "the" and before word "preformed" add word -- decorative --.

Column 13,
Line 1, after word "the" and before partial word "pre-" add word -- decorative --.
Line 4, delete word "the" before word "Polymeric"; and delete capital letter "P" in word -- Polymeric --.
Line 5, delete word "the" before word "flexible".
Line 6, delete word "the" before word "flexible"; and after word "flexible" and before word "material" add words -- laminated polymeric --.
Line 8, after word "the" and before word "preformed" add word -- decorative --.
Line 9, delete word "a" before word "sheet" and replace with word -- the --; and after words "sheet of" delete word "the".
Line 12, change number "122" to number -- 110 --.
Line 16, after word "having" change word "an" to word -- a --.
Line 20, after word "direction" and before number "148" add the following -- indicated by an arrow --.
Line 23, change number "146" to number -- 144 --.
Line 24, before word "polymeric" add word -- flexible --.
Line 27, after word "the" and before partial word "pre" add word -- decorative --.
Line 29, after word "above" and before word "may" delete "comma".
Line 44, after word "cover" and before word "for" add number -- 160 --.
Line 50, after word "the" and before word "flexible" add words -- sheet of --.
Line 51, after word "the" and before word "laminated" add words -- sheet of --.
Line 55, after word "provide" and before word "sleeve" delete word "with" and replace with word -- the --; and after number "162" remove "comma".

UNITED STATES PATENT AND TRADEMARK OFFICE
CERTIFICATE OF CORRECTION

PATENT NO.    : 6,425,224 B1
DATED         : July 30, 2002
INVENTOR(S)   : Donald E. Weder It is certified that error appears in the above-identified patent and that said Letters Patent is hereby corrected as shown below:

Column 14,
Line 6, after number "166" add word -- thereof --.
Line 11, after number "162" delete words "has a" and replace with word -- is --; and after word "closed" add a -- comma --.
Line 12, delete words "lower end 168," before words "a portion of"; and delete period after word "end" and before number "168".
Line 24, after word "fanciful" and before word "as" add a -- comma --.
Line 33, after word "of" and before word "polymeric" add word -- flexible --.
Line 45, after word "illustrated" and before word "having" add word -- as --.
Line 47, change number "184" to number -- 164 --.
Line 59, after number "162" and before word "such" add a -- comma --.
Line 60, change word "means" to word -- method --.
Line 61, after word "employed" and before word "such" add a -- comma --.

Column 15,
Line 5, delete words "(not shown)" and replace with following -- , as will be described in further detail below --.
Line 20, change number "62" to number -- 162 --.
Line 22, change number "162" to number -- 172 --.
Line 25, after word "pattern" and before word "including" add a -- comma --.
Line 31, change word "means" to word -- methods --.
Line 34, after number "5,111,637" add the following -- issued to Weder et al. on May 12, 1993, --.
Line 35, after word "hereby" and before word "incorporated" add word -- expressly --.
Line 40, after number "162" and before word "while" delete "comma".
Line 46, change number "165" to number -- 164 --.
Line 50, change word "means" to word -- method --.
Line 58, delete phrase "Ser. No. 08/237,078" and replace with following -- Patent No. 5,625,979, issued to Weder on May 6, 1997, --.
Line 63, after word "sleeve" and before word "having" add number -- 162b --.
Line 65, after word "the" and before word "polymeric" add words -- sheet of --; and after number "10" and before word "or" delete "comma".
Line 66, before word "flexible" add words -- sheet of --.
Line 67, after word "invention" delete remainder of line.

UNITED STATES PATENT AND TRADEMARK OFFICE
CERTIFICATE OF CORRECTION

PATENT NO. : 6,425,224 B1
DATED : July 30, 2002
INVENTOR(S) : Donald E. Weder

It is certified that error appears in the above-identified patent and that said Letters Patent is hereby corrected as shown below:

Column 16,
Line 1, delete words "ence numeral 162b".
Line 23, delete phrase "potted plant 176b" and replace with -- flower pot 187 --.
Lines 29, 33, 53 and 54, change number "176b" to number -- 187 --.
Line 30, after number "162b" delete remainder of line.
Line 31, delete entire line.
Line 32, delete words "of the sleeve 162b and".
Line 46, after second number "196" add words -- of the lower portion 190 of the sleeve 162b --.
Line 47, after number "190" add words -- of the sleeve 162b --.
Line 48, change number "176b" to number -- 187 --; after number "190" add words -- of the sleeve 162b --.
Line 49, after word "surface" and before word "which" add number -- 172b --.
Line 50, after word "surrounds" and before word "outer" delete word "the" and replace with word -- an --; after word "surface" and before word "of" add number -- 199 --.
Line 51, change number "176b" to number -- 187 --; after number "198" add following -- of the lower portion 190 of the sleeve 162b --.
Line 52, after number "190" add following -- of the sleeve 162b --; and after word "end" and before word "of" add number -- 201 --.
Lines 59 and 64, after number "198" add the following -- of the sleeve 162b --.

Column 17,
Line 3, after number "188" add the following -- of the sleeve 162b --.
Line 5, after number "162b" add the following -- and the upper end 166b of the sleeve 162b --.
Line 8, delete words "vertical perfo-" and replace with -- detaching element --.
Line 9, delete partial word "rations"
Line 13, change number "176b" to number -- 187 --; and after number "192" add a -- comma --.
Line 14, after number "202" and before word "as" add a -- comma --; and after number "19" and before word "which" add a -- comma --.
Line 16, change number "176b" to number -- 187 --.
Line 17, change number "124" to number -- 164b --.
Line 20, after number "188" and before word "is" add following -- of the sleeve "162b --.
Line 22, after number "190" and before word "may" add following -- of the sleeve "162b --.
Line 23, after word "so" and before word "both" change word "the" to word -- that --.
Line 24, change number "162" to number -- 162b --.
Line 26, after number "188" and before word "is" add following -- of the sleeve 162b --.
Line 27, after word "remains" and before word "about" add word -- disposed --; and change number "176b" to number -- 187 --.

UNITED STATES PATENT AND TRADEMARK OFFICE
CERTIFICATE OF CORRECTION

PATENT NO. : 6,425,224 B1
DATED : July 30, 2002
INVENTOR(S) : Donald E. Weder

It is certified that error appears in the above-identified patent and that said Letters Patent is hereby corrected as shown below:

Column 17 (cont'd),
Line 28, after word "forms" and before word "decorative" change word "a" to word -- the --; after word "cover" and before word "about" add number -- 202 --; and change number "176b" to number -- 187 --.
Line 30, delete words "or 'detaching means'".
Line 31, after word "herein" and before word "means" delete "comma".
Line 40, change word "sleeves" to word -- sleeve --; and delete words "162 and".
Line 41, after word "cover" and before word "for" add number -- 202 --.
Line 42, delete words "162 or"; after number "162b" and before word "and" delete "comma"; and change number "176b" to number -- 187 --.
Line 43, after word "medium" and before word "contained" add number -- 203 --.
Line 44, change number "176b" to number -- 187 --.
Line 45, after number "192" and before number "contained" add the following -- and the growing medium 203 --.
Line 46, delete words "162 or" where they appear twice in line; delete words "its first"; before word "end" add -- the upper --; and after word "end" add -- 166b thereof --.
Line 47, after word "opening" and before word "therein" add number -- 170b --.
Line 48, after word "surface" and before word "of" add number -- 172b --.
Line 49, delete words "162 or".
Line 51, change number "176b" to number -- 187 --; and after word "opening" and before word "in" add number -- 170b --.
Line 52, delete words "162 or"; and change number "176b" to number -- 187 --.
Line 53, after word "portion" and before word "of" add number -- 188 --; and delete words "162 or".
Line 54, after word "portion" and before word "of" add number -- 190 --; and, delete words "162 or".
Line 55, change number "176b" to number -- 187 --; and after word "portion" and before word "of" add number -- 190 --.
Line 56, delete words "162 or" in two places it appears on line.
Line 58, change number "176b" to number -- 187 --; and delete number "162".
Line 59, delete word "or" before number "162b" and delete word "having" after number "162b" and replace with words -- maybe provided with --; and delete words "may be utilized," and replace with word -- and --.
Line 60, delete words "162 or"; after number "162b" delete word "being" and replace with words -- may be --; after word "rods" and before word "or" delete "comma"; and after word "wickets" add a -- comma --.
Line 61, delete words "176b then being" and replace with words -- 187 may then be --.
Line 62, delete words "162 or" in two places it appears on line.

UNITED STATES PATENT AND TRADEMARK OFFICE
CERTIFICATE OF CORRECTION

PATENT NO. : 6,425,224 B1
DATED : July 30, 2002
INVENTOR(S) : Donald E. Weder

It is certified that error appears in the above-identified patent and that said Letters Patent is hereby corrected as shown below:

Column 18,
Lines 4, 8, 10 and 24, change word "matt" to word -- matte --.
Line 16, after word "paper" and before word "by" delete word "or".
Line 17, after word "material" and before word "by" delete word "or".
Line 20, after word "pattern" and before word "wherein" add a -- comma --.
Line 41, after number "30" change word "mils" to word -- mil --.
Line 42, after numbers "0.5" and "10" change word "mils" to word -- mil --.
Lines 43 and 50, after number "0.5" add word -- mil --.
Line 44, after number "10" change word "mils" to word -- mil --.
Lines 51, 52 and 54, change word "mils" to word -- mil --.
Line 53, after number "0.5" add word -- mil --; and after number "10" change word "mils" to word -- mil --.

Column 19,
Lines 4 and 11, change word "matt" to word -- matte --.
Line 8, delete word "a" before word "matt" and replace with word -- the --; change word "matt" to word -- matte --; and after word "finish" and before word "assimilating" add number -- 226 --.
Line 10, after number "222" and before word "and" add a -- comma --.
Line 14, after word "material" and before word "with" add number -- 220 --.
Line 20, change word "matt" to word -- matte --; and change number "212" to number -- 226 --.
Line 38, after word "addition" delete words "a matt" and replace with -- the matte --.
Line 39, after word "finish" and before word "capable" add number -- 226 --.
Line 40, after word "material" and before word "with" add number -- 220 --.
Line 51, after word "surfaces" and before word "of" add numbers -- 234 and 236 --.
Line 53, after number "232" and before word "and" add a -- comma --.
Line 55, after word "material" and before word "with" add number -- 230 --; change word "matt" to word -- matte --; and after word "finish" and before partial word "assimi-" add number -- 239 --.
Line 61, change word "matt" to word -- matte --; and after word "finish" and before word "can" add number -- 239 --.
Line 62, after word "printing" delete words "a web of" and replace with word -- the --; and after word "polymeric" delete word "material" and replace with -- film 232 --.
Line 63, after word "surface" and before word "of" add numbers -- 234 and 236 --; and after word "the" delete words "sheet of".
Line 64, after word "polymeric" delete word "material" and replace with -- film 232 --.
Line 65, after word "the" and before word "polymeric" delete words "sheet of"; and after word "polymeric" delete word "material" and replace with -- film 232 --.
Line 67, delete words "sheet of at two places where they appear in line; and after word "polymeric" delete word "material" and replace with words -- film 232 --.

UNITED STATES PATENT AND TRADEMARK OFFICE
CERTIFICATE OF CORRECTION

| | | |
|---|---|---|
| PATENT NO. | : 6,425,224 B1 | |
| DATED | : July 30, 2002 | |
| INVENTOR(S) | : Donald E. Weder | |

It is certified that error appears in the above-identified patent and that said Letters Patent is hereby corrected as shown below:

<u>Column 20,</u>
Line 1, after word "polymeric" delete word "material" and replace with words -- film 232 --.
Lines 3 and 9, after word "the" delete words "sheet of"; and after. word "polymeric" delete word "material" and replace with words -- film 232 --.
Line 5, after word "registry" and before word "or" add a -- comma --.
Line 8, after word "addition" and before word "or" delete words "a matt" and replace with -- the matte --; and after word "finish" and before word "capable" add number -- 240 --.
Line 12, after word "the" delete words "web of material" and replace with words -- polymeric film 232 --.
Line 15, after word "polymeric" delete words "film 232" and replace with words -- ribbon material 230 --.
Line 17, after word "polymeric" and before word "with" delete word "material" and replace with words -- film 232 --.
Line 22, change number "210" to number -- 230 --.
Line 23, after number "30" change word "mils" to word -- mil --.
Lines 24 and 26, change word " mils" to word -- mil --.
Line 25, after number "0.6" add word -- mil --.

Signed and Sealed this

Twenty-first Day of September, 2004

JON W. DUDAS
*Director of the United States Patent and Trademark Office*